United States Patent
Shanbhogue et al.

(10) Patent No.: US 10,620,969 B2
(45) Date of Patent: Apr. 14, 2020

(54) SYSTEM, APPARATUS AND METHOD FOR PROVIDING HARDWARE FEEDBACK INFORMATION IN A PROCESSOR

(71) Applicant: Intel Corporation, Santa Clara, CA (US)

(72) Inventors: Vedvyas Shanbhogue, Austin, TX (US); Avinash N. Ananthakrishnan, Portland, OR (US); Eugene Gorbatov, Hillsboro, OR (US); Russell Fenger, Beaverton, OR (US); Ashok Raj, Portland, OR (US); Kameswar Subramaniam, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 204 days.

(21) Appl. No.: 15/936,585

(22) Filed: Mar. 27, 2018

(65) Prior Publication Data

US 2019/0042280 A1 Feb. 7, 2019

(51) Int. Cl.
| | | |
|---|---|---|
| G06F 9/44 | (2018.01) | |
| G06F 11/30 | (2006.01) | |
| G06F 11/34 | (2006.01) | |
| G06F 1/32 | (2019.01) | |
| G06F 9/445 | (2018.01) | |
| G06F 1/3206 | (2019.01) | |

(52) U.S. Cl.
CPC ........ *G06F 9/44505* (2013.01); *G06F 1/3206* (2013.01); *G06F 11/3024* (2013.01); *G06F 11/3409* (2013.01)

(58) Field of Classification Search
CPC ............ G06F 9/44505; G06F 11/3024; G06F 11/3409; G06F 1/3206
See application file for complete search history.

(56) References Cited

U.S. PATENT DOCUMENTS

| 5,163,153 A | 11/1992 | Cole et al. | |
|---|---|---|---|
| 5,202,998 A * | 4/1993 | Yanes | G06F 15/17 710/267 |

(Continued)

FOREIGN PATENT DOCUMENTS

EP 1 282 030 A1 5/2003

OTHER PUBLICATIONS

International Searching Authority, "Notification of Transmittal of the International Search Report and the Written Opinion of the International Searching Authority," dated Jun. 18, 2019, in International application No. PCT/US2019/019961.

(Continued)

*Primary Examiner* — Stefan Stoynov
(74) *Attorney, Agent, or Firm* — Trop, Pruner & Hu, P.C.

(57) ABSTRACT

In one embodiment, a processor includes a plurality of cores to execute instructions, a first identification register having a first field to store a feedback indicator to indicate to an operating system (OS) that the processor is to provide hardware feedback information to the OS dynamically and a power controller coupled to the plurality of cores. The power controller may include a feedback control circuit to dynamically determine the hardware feedback information for at least one of the plurality of cores and inform the OS of an update to the hardware feedback information. Other embodiments are described and claimed.

20 Claims, 25 Drawing Sheets

(56) References Cited

U.S. PATENT DOCUMENTS

| | | | |
|---|---|---|---|
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,480,966 B1* | 11/2002 | Rawson, III | G06F 9/54 710/260 |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 9,417,879 B2* | 8/2016 | Wilkerson | G06F 9/3836 |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2005/0216779 A1* | 9/2005 | Ferrand | G06F 1/3228 713/324 |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0073875 A1 | 3/2013 | Anderson et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0283032 A1 | 10/2013 | Therien et al. | |
| 2013/0346774 A1 | 12/2013 | Bhandaru et al. | |
| 2014/0068290 A1 | 3/2014 | Bhandaru et al. | |
| 2014/0129808 A1 | 5/2014 | Naveh et al. | |
| 2014/0149774 A1 | 5/2014 | Burns et al. | |
| 2014/0195829 A1 | 7/2014 | Bhandaru et al. | |
| 2014/0208141 A1 | 7/2014 | Bhandaru et al. | |
| 2015/0212569 A1 | 7/2015 | Goyal et al. | |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 111-116.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3B: System Programming Guide, Part 2, Apr. 2016, Chapter 14 Power and Thermal Management (14.1-14.9.5), 39 pages.

* cited by examiner

SYSTEM, APPARATUS AND METHOD FOR PROVIDING HARDWARE FEEDBACK INFORMATION IN A PROCESSOR

TECHNICAL FIELD

Embodiments relate to a processor having an interface for providing scheduling information.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
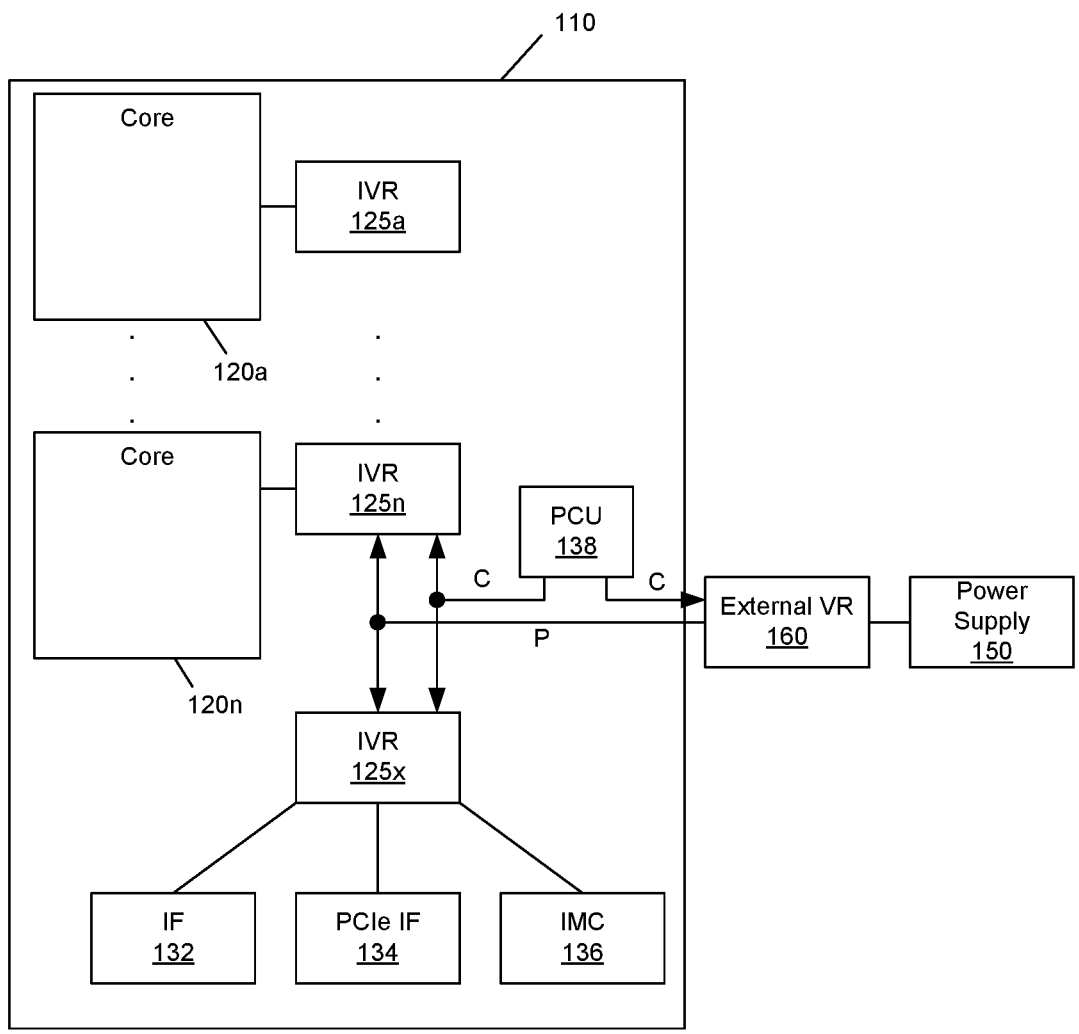
FIG. 1 is a block diagram of a portion of a system in accordance with an embodiment of the present invention.

In various embodiments, instruction set architecture (ISA) extensions may be provided in a processor to implement a hardware scheduling interface to deliver hardware guidance to a scheduler to enable the scheduler to perform optimal workload scheduling. To this end, an operating system (OS) or other system software may provide hardware with a pointer to a table in memory where the processor hardware can produce feedback to be provided to the OS scheduler about the performance and energy efficiency capabilities of each core of the processor. In another embodiment, this table may be located in a bank of registers that is mapped into the OS address space. The OS scheduler can be notified when this information changes, e.g., via an interrupt technique. The table in memory also provides information on the changes since the last interrupt to allow the operating system to make quick decisions on the data. Embodiments may also allow the operating system to be in a polling mode when interrupt processing is not possible. In contrast to conventional scheduling in which static class assignment for core capabilities is assumed (as enumerated during system initialization), embodiments provide support for dynamic processor performance and efficiency capability enumeration.

Embodiments thus provide information that can be used by a scheduler to make better scheduling decisions. This is so, as with an embodiment a scheduler becomes aware of dynamic capabilities of individual cores, and/or logical processors. With this greater access to information, the OS can better schedule given threads to a more appropriate core based on the type of thread, current capabilities of the logical processors and the characteristics of the workloads being executed on the logical processors. As will be described herein, this dynamic computation of current capabilities is based at least in part on workload and constraints on the processor such as power delivery and thermal headroom, among others. With the dynamically calculated hardware feedback information described herein, the scheduler can make more informed scheduling decisions, improving computation, power and energy efficiency.

In embodiments, processor hardware such as may be implemented within a power controller of the processor may be configured to continuously compute processor performance and energy efficiency capability information, given system workload and power and thermal limits. This capability information is provided to the OS through the hardware scheduling interface. In turn, the OS or other scheduling entity accesses this information and updates its internal scheduling structures. The updated capability information is then used by the scheduler to make optimal scheduling decisions.

In an embodiment, the dynamic feedback information may be in the form of processor performance and energy efficiency capabilities. Conceptually, each capability is represented as an array of values with one entry per logical processor. Each entry specifies relative performance or energy efficiency of a logical processor given current system workload and power and thermal constraints. In a particular embodiment, the performance capability of a logical processor is a relative value, such as an 8-bit (0 . . . 255) value specifying current performance level of this logical processor. A higher performance capability indicates higher relative performance. The lowest performance capability (e.g., 0) indicates to the OS that it can idle the logical processor and not schedule any software threads to it. In one embodiment, the energy efficiency capability information has similar semantics. Each value represents a relative value indicating relative energy efficiency of a logical processor, and may be an 8-bit value (0 . . . 255), with higher values indicating higher energy efficiency. The lowest energy efficiency capability value (e.g., 0) indicates to the OS that this logical processor may not be used due to efficiency reasons. Note that various techniques may be used to dynamically calculate these values.

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In embodiments herein, PCU 138 may be configured to dynamically determine hardware feedback information regarding performance and energy efficiency capabilities of hardware circuits such as cores 120 and provide an interface to enable an OS scheduler to access this information, for use in making better scheduling decisions. To this end, PCU 138 may be configured to determine and store such information, either internally to PCU 138 or in another storage of system 100.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Processors described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Figure 2:
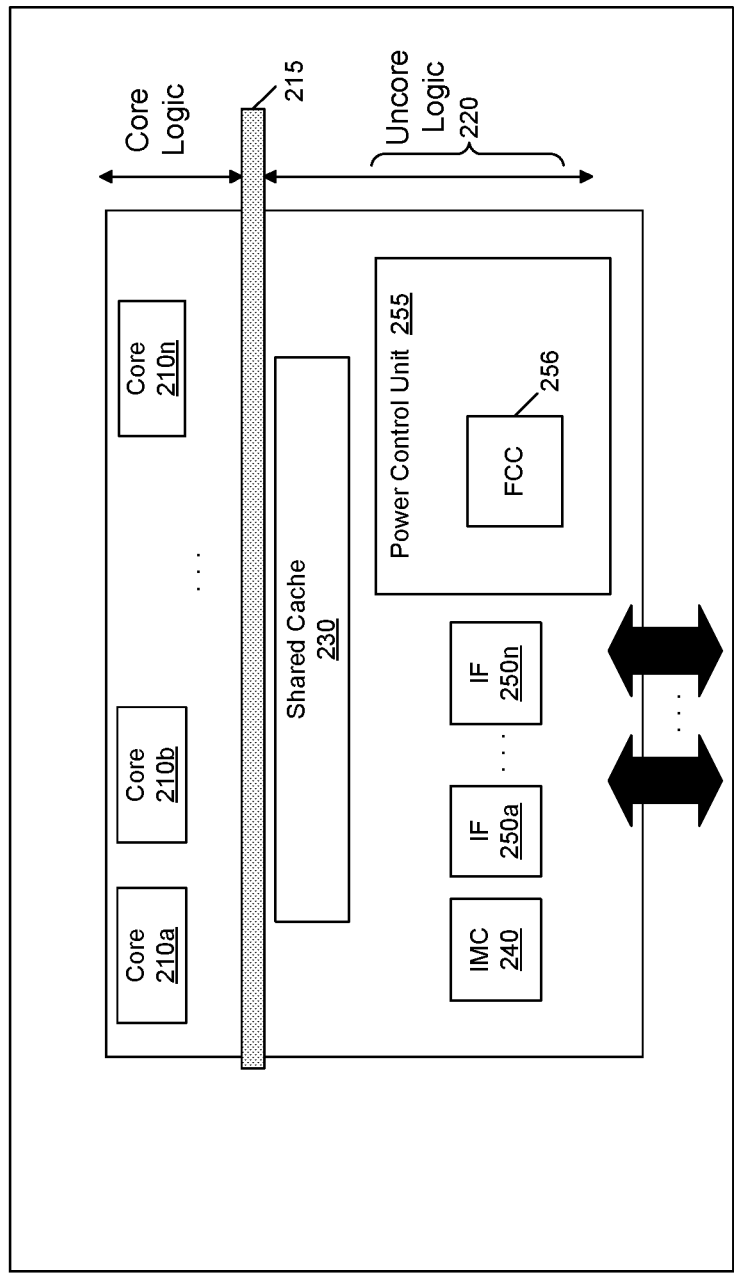
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform power management techniques as described herein. In addition, power control unit 255 may include a feedback control circuit 256, configured to dynamically determine hardware feedback information and enable communication of such information to a scheduler as described herein.

In addition, by interfaces $250_a$-$250_n$, connection can be made to various off-chip components such as peripheral devices, mass storage and so forth. While shown with this particular implementation in the embodiment of FIG. 2, the scope of the present invention is not limited in this regard.

Figure 3:
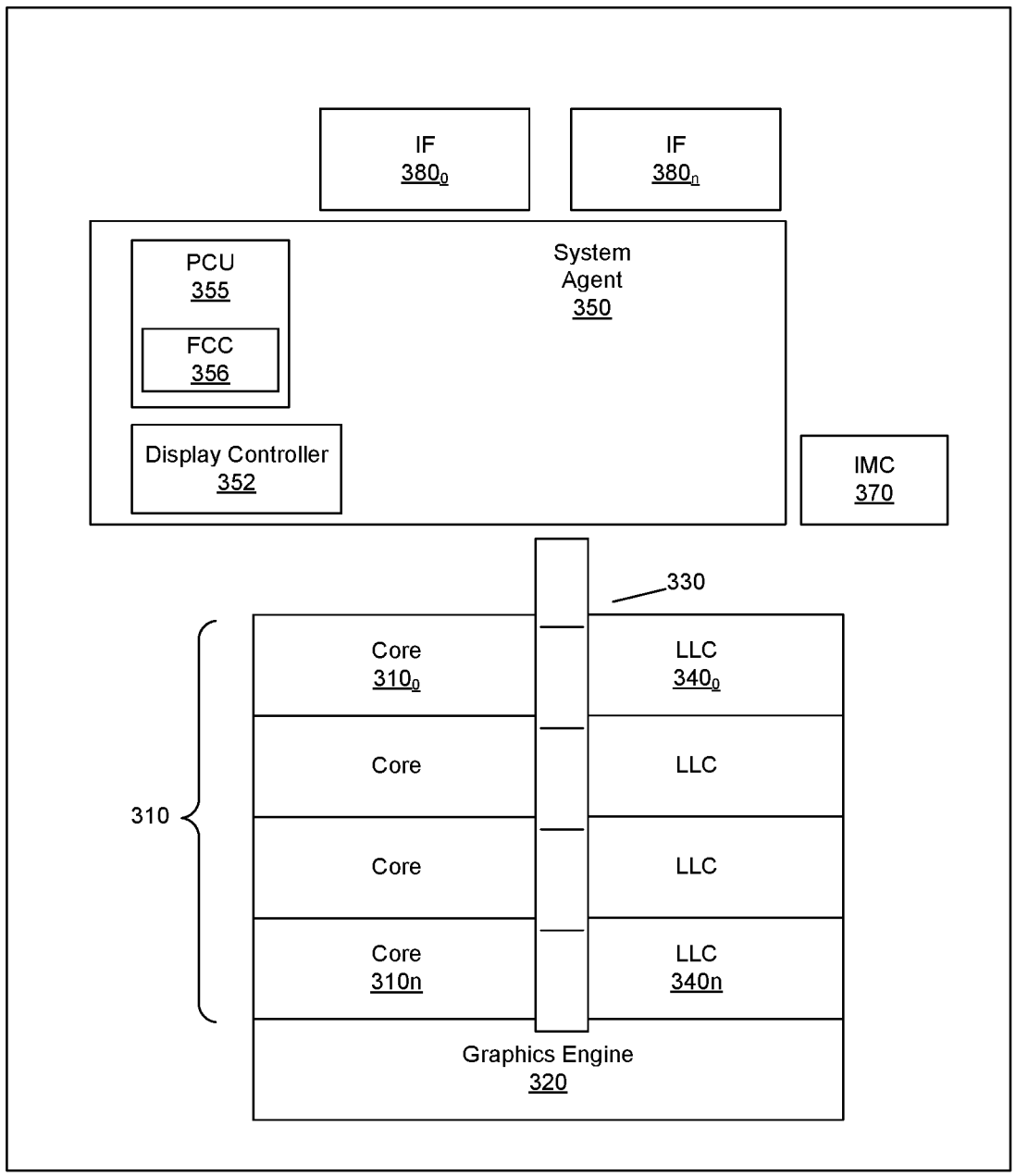
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355, which can include a feedback control circuit 356 to dynamically determine hardware feedback information regarding cores 310 and other execution engines and provide such information to a scheduler, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
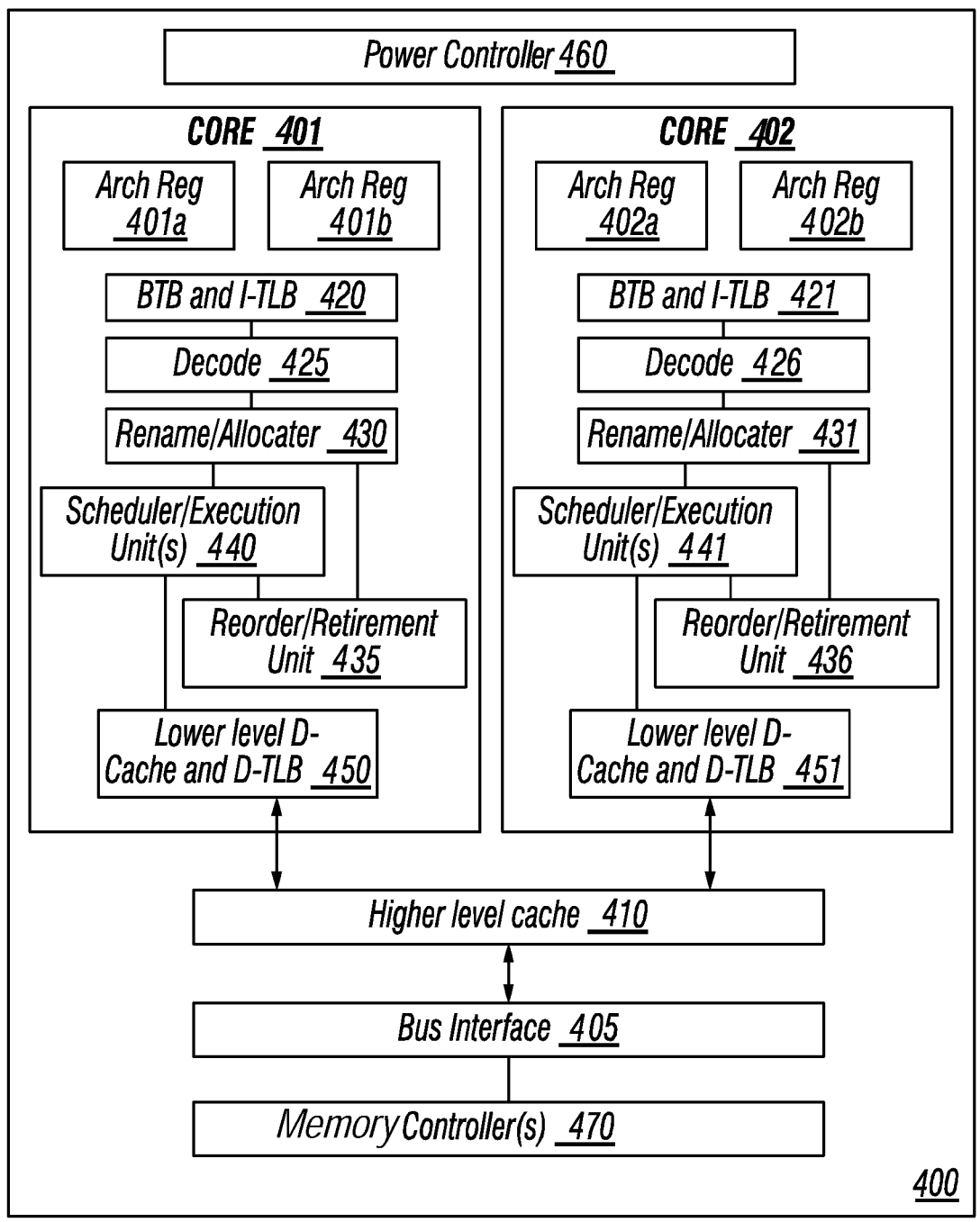
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
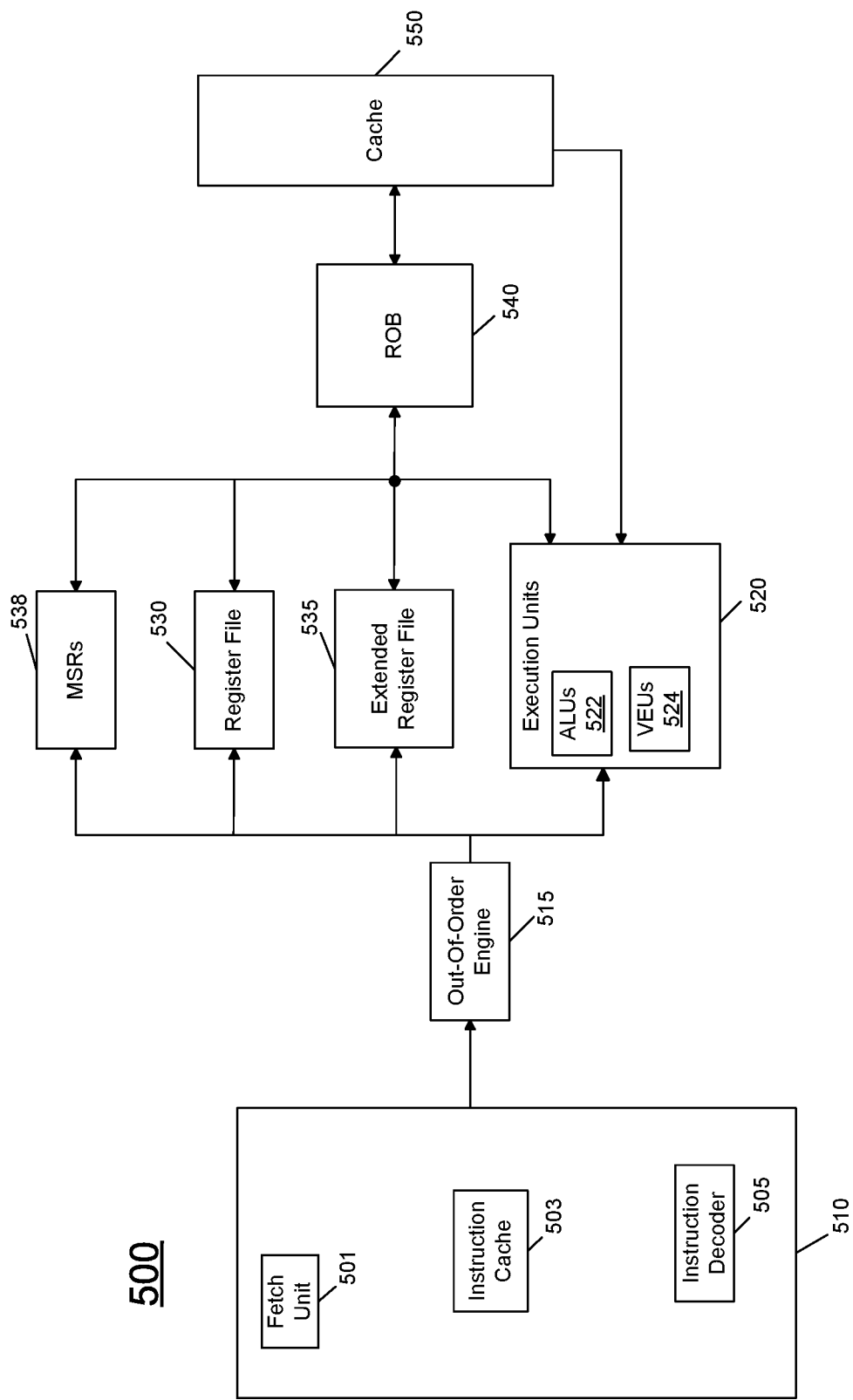
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. Note that performance and energy efficiency capabilities of core 500 may vary based on workload and/or processor constraints. As such, a power controller (not shown in FIG. 5) may dynamically determine feedback information including performance and energy efficiency capabilities, for use in scheduling decisions as described herein. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
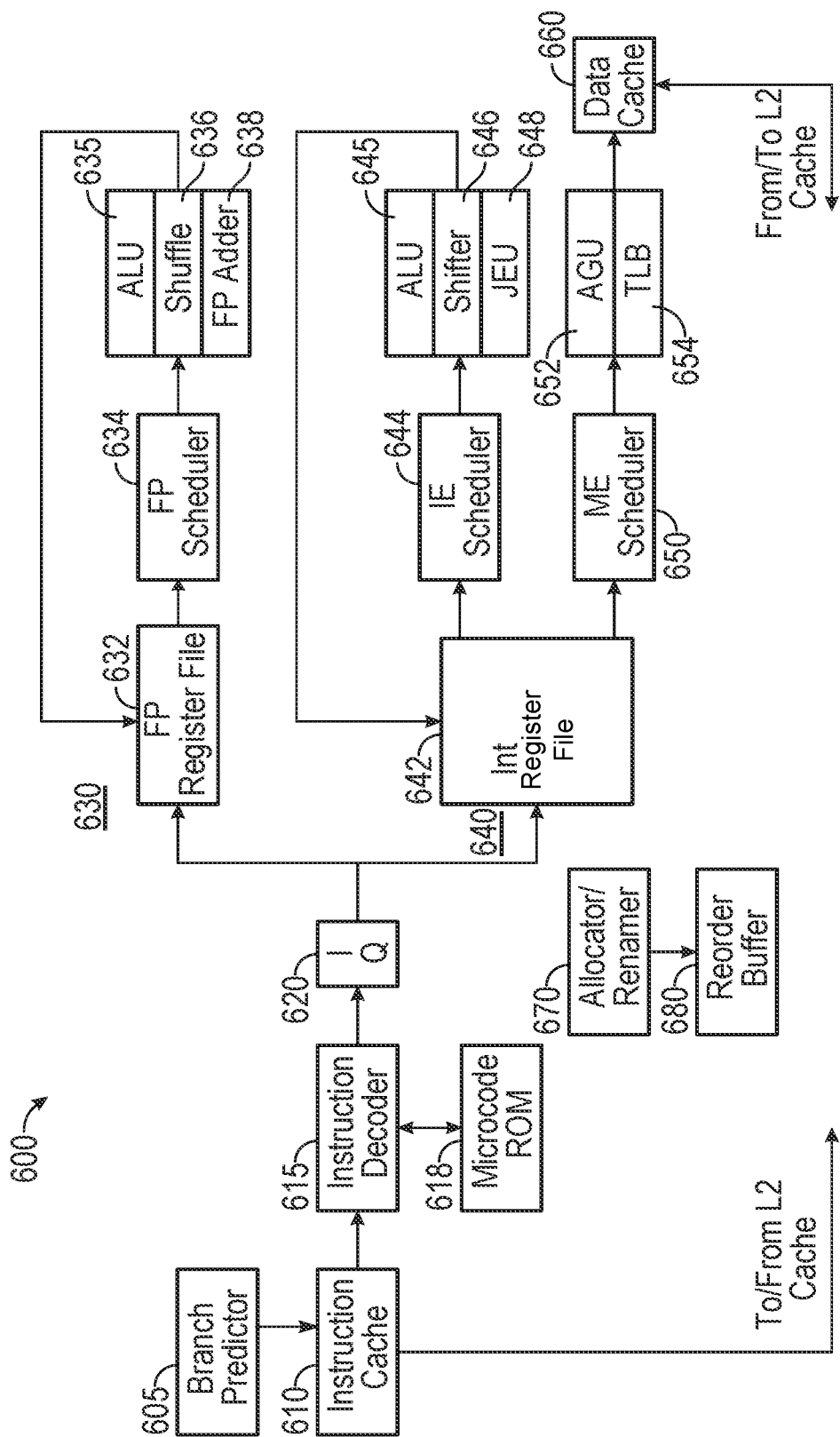
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Note that performance and energy efficiency capabilities of core 600 may vary based on workload and/or processor constraints. As such, a power controller (not shown in FIG. 6) may dynamically determine feedback information including performance and energy efficiency capabilities, for use in scheduling decisions as described herein. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
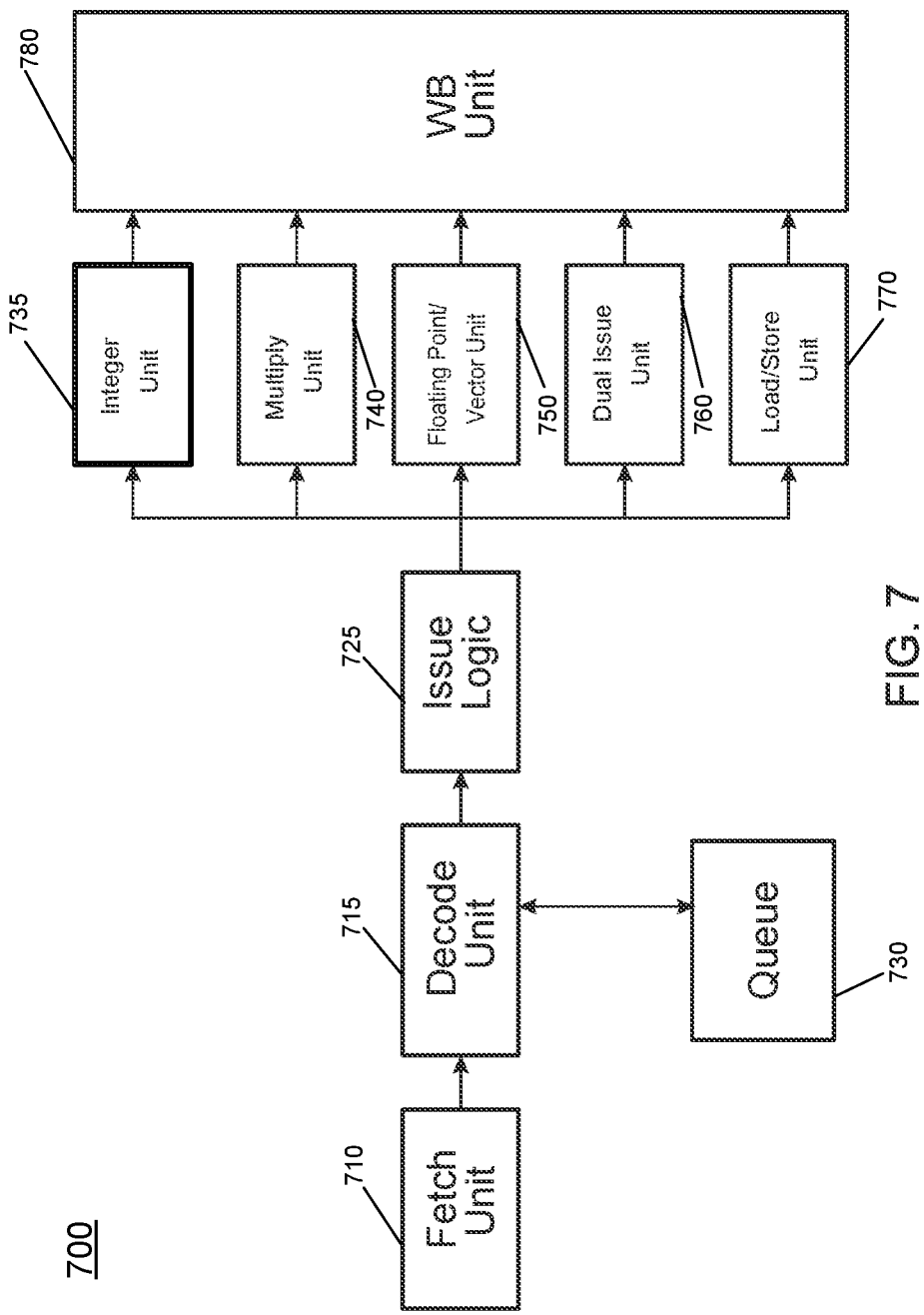
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions, including an in-field self test instruction as described herein, and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
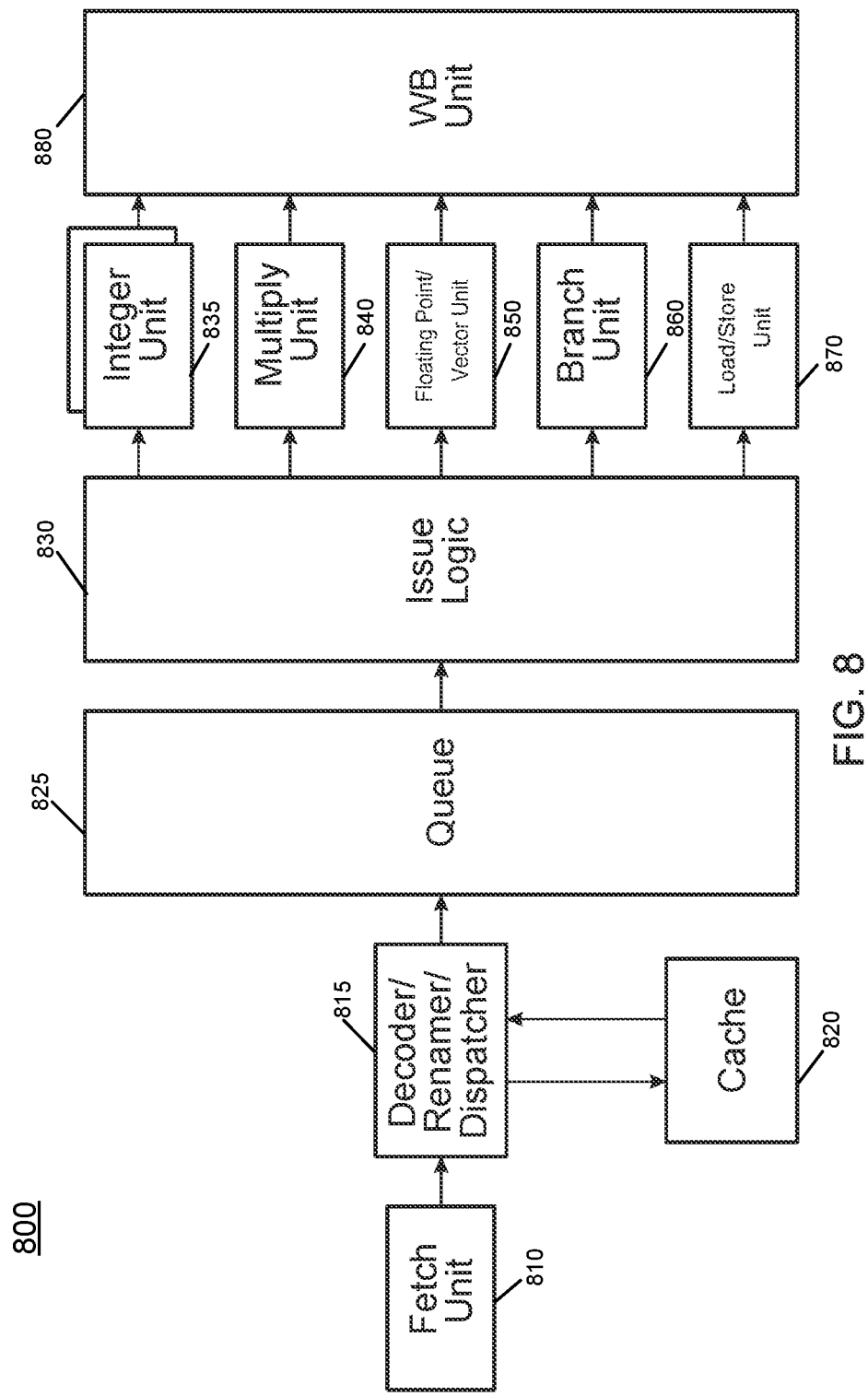
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions, including an in-field self test instruction as described herein, and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825.

Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
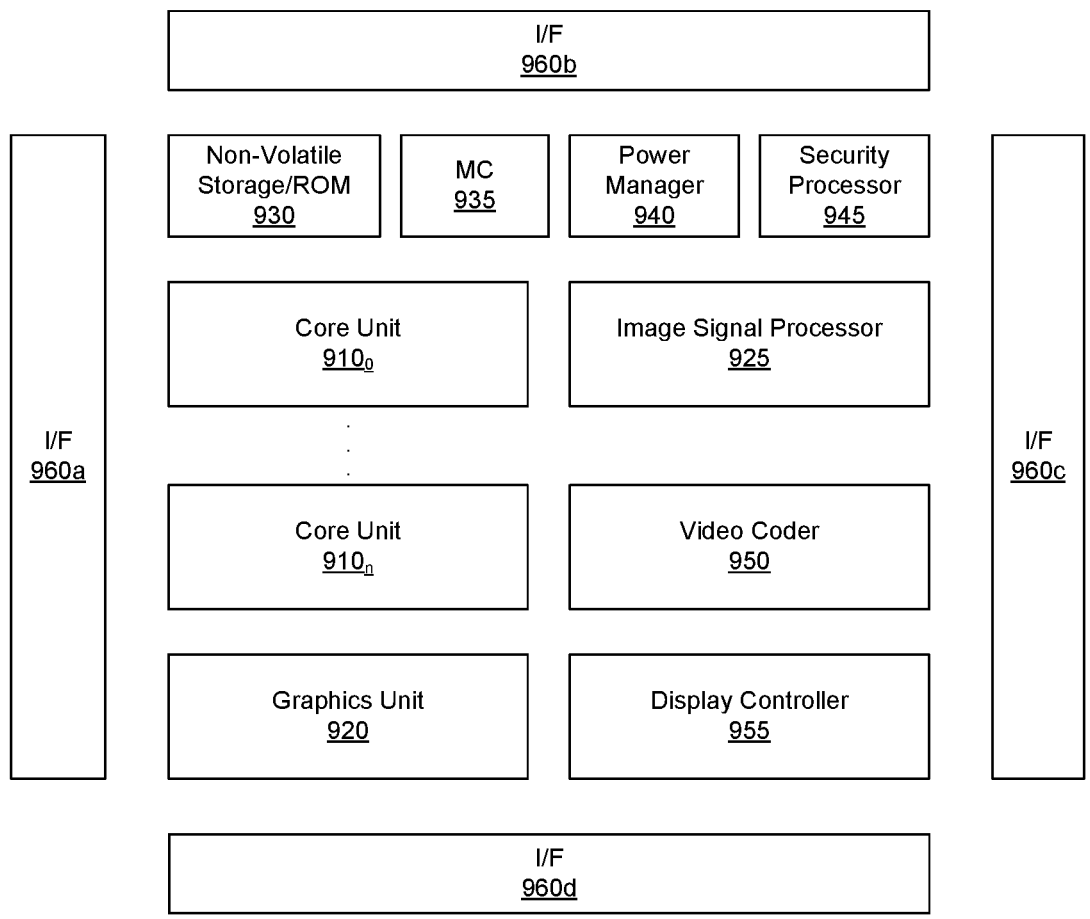
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, or a vehicle computing system.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software, test patterns for the diagnostic self-testing described herein, or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including the dynamic determination of hardware feedback information, for communication to a scheduler.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
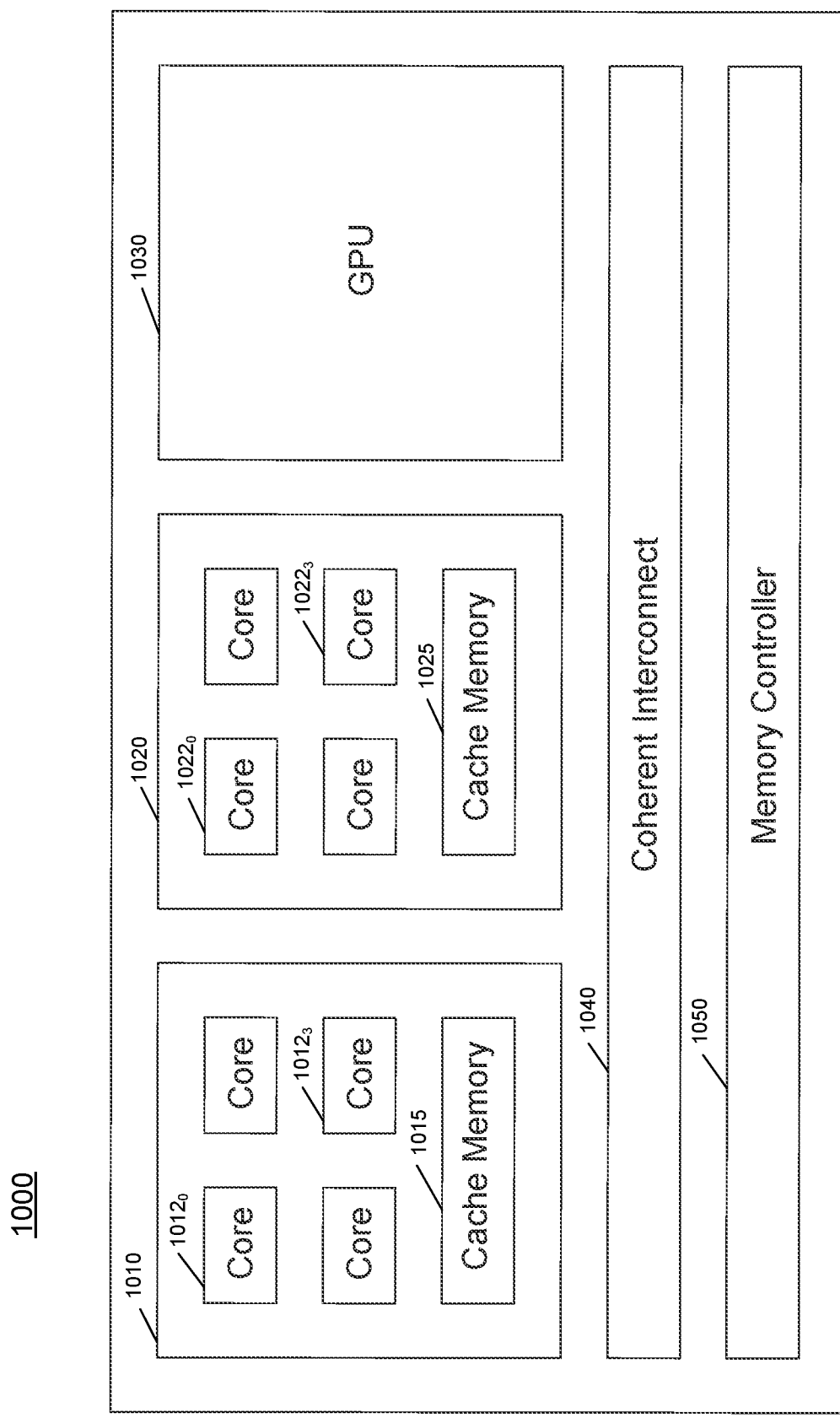
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device or vehicle computing system. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores that may interface with corresponding core perimeter logic via a mailbox interface as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
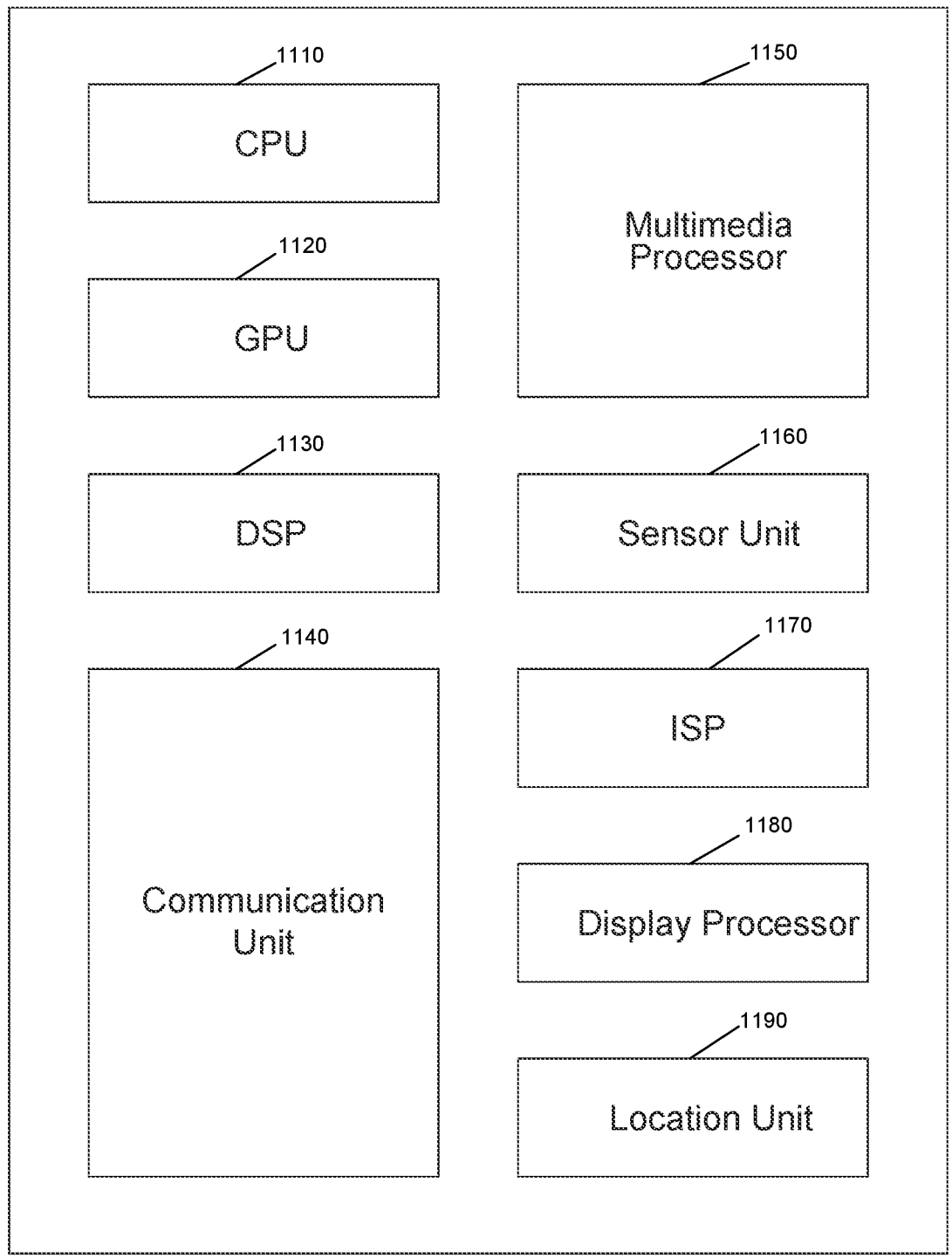
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs, vehicle computing systems, and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
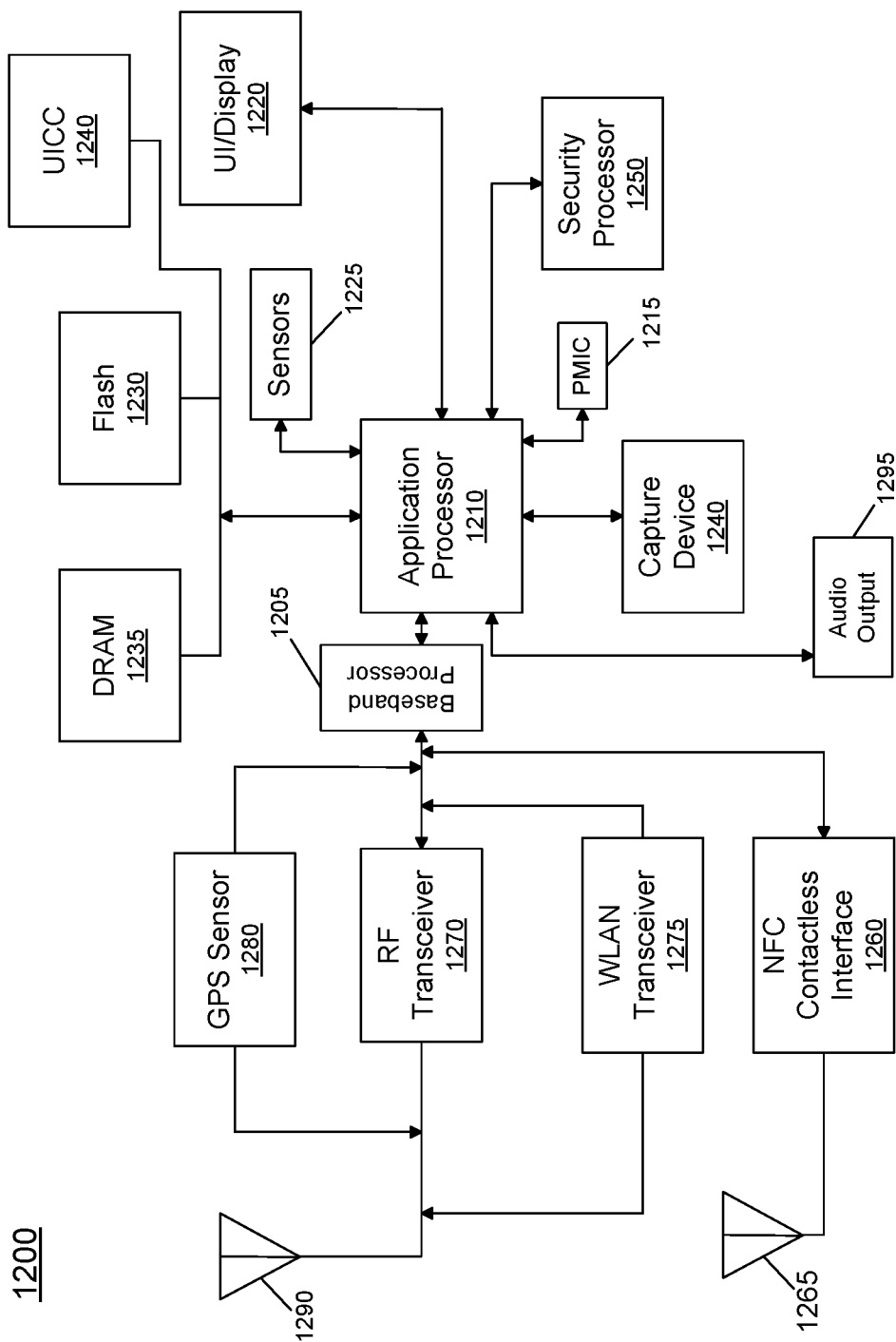
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may include a power controller as described herein, and may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
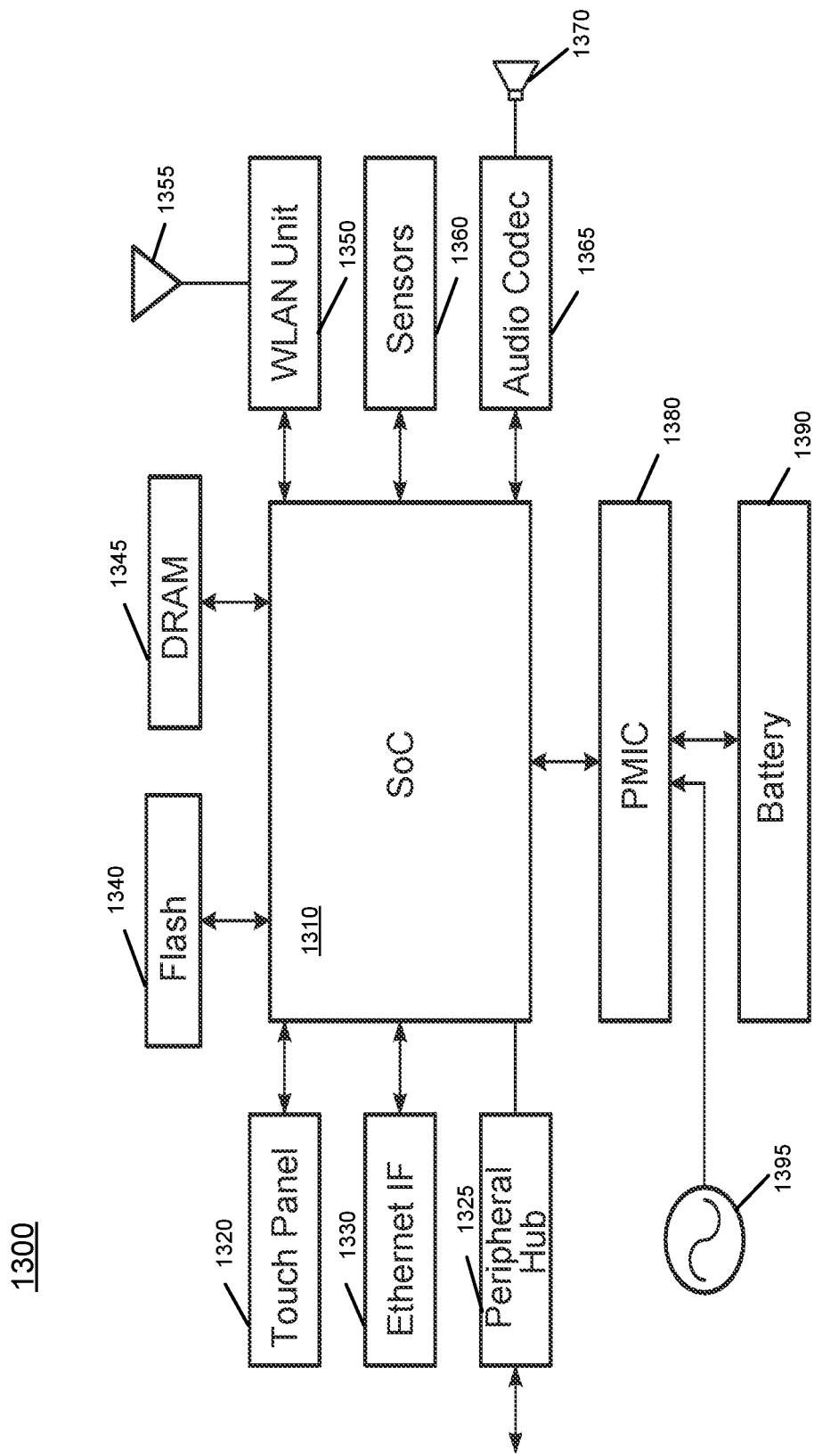
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and which may include a power controller as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
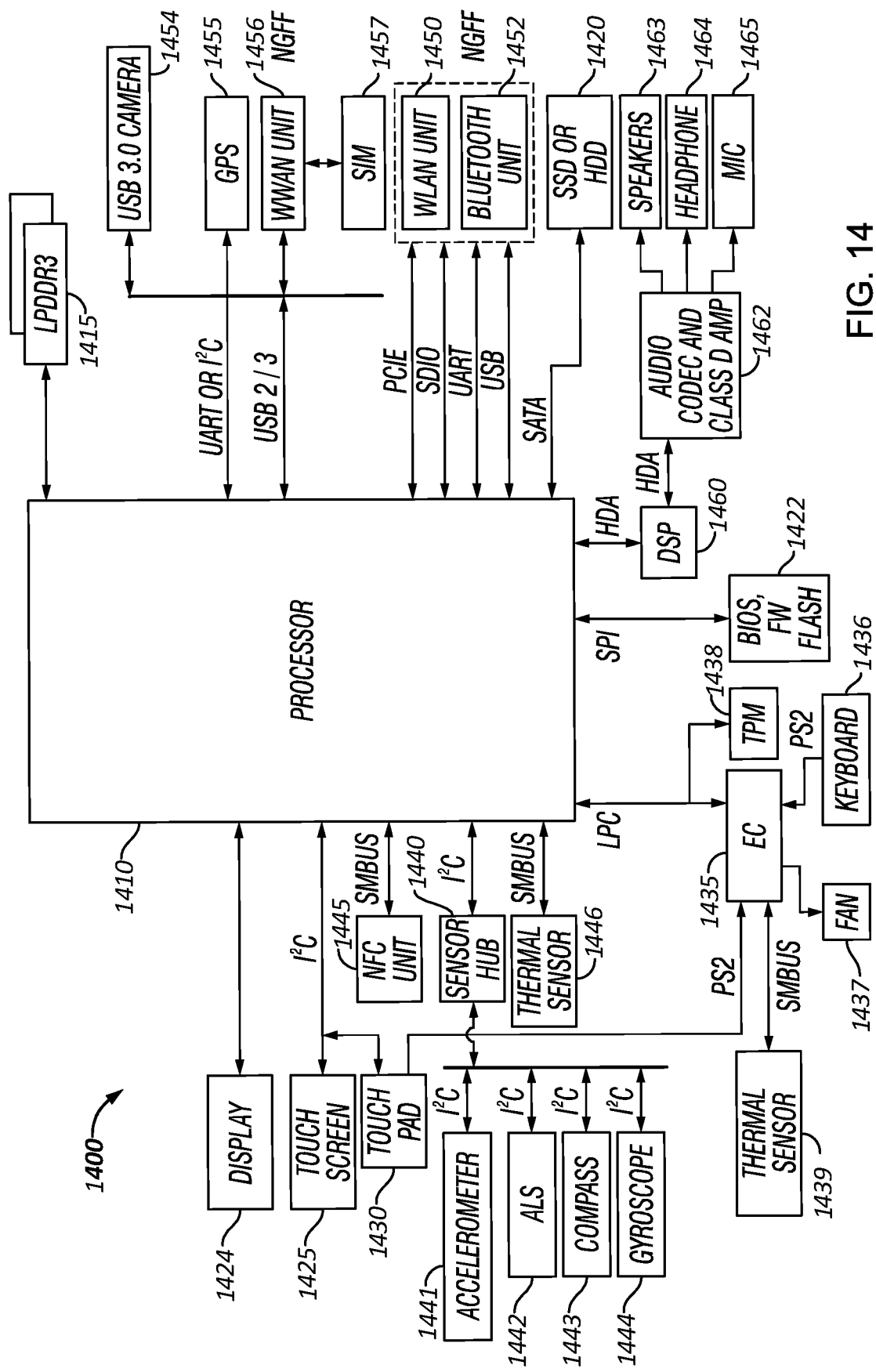
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC and which may include a power controller as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
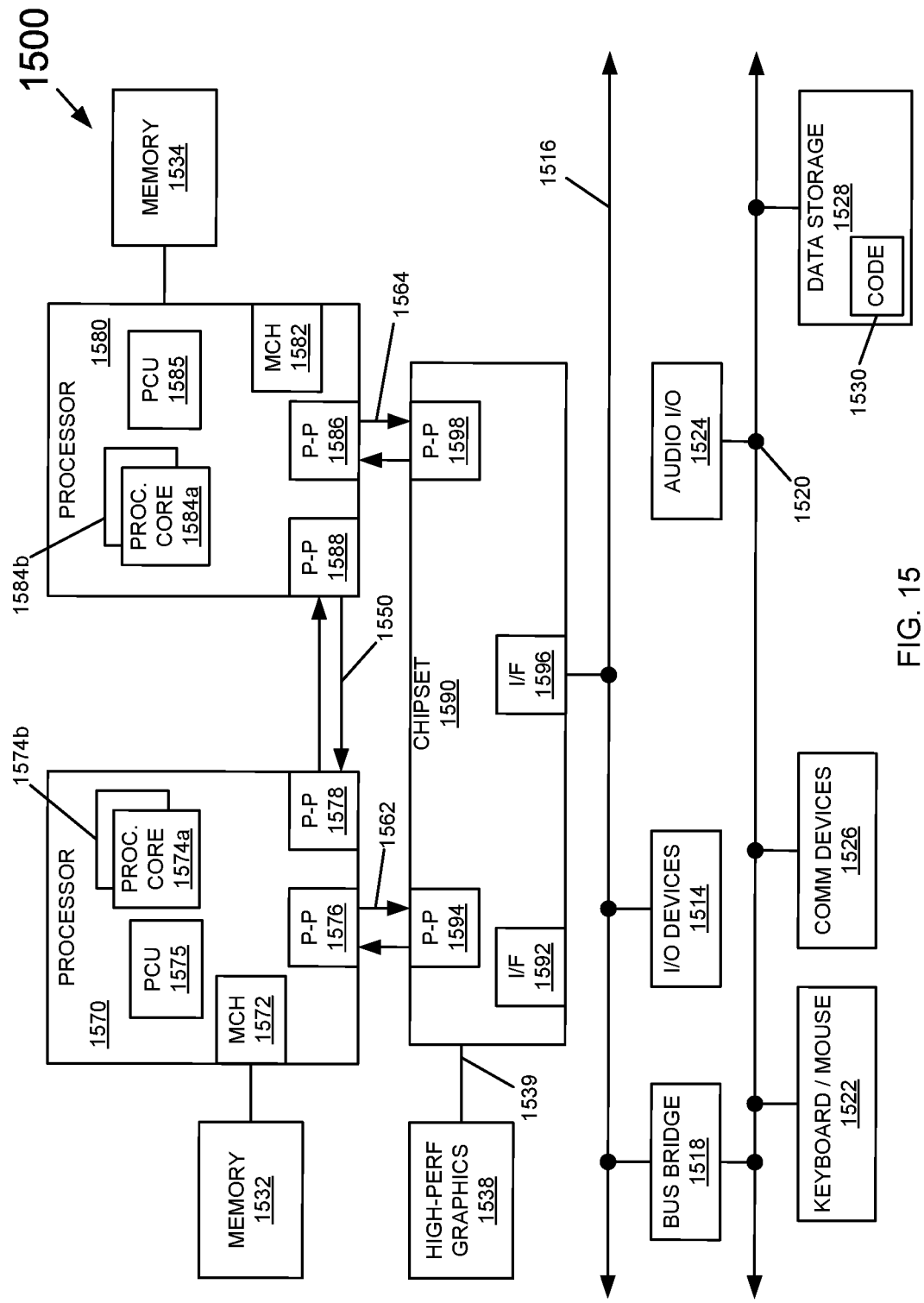
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU 1575, 1585 or other power management logic to perform processor-based power management as described herein. To this end, PCUs 1575 and 1585 include feedback control circuitry to dynamically determine capabilities of corresponding cores and enable such information to be stored and provided to a scheduler such as an OS scheduler, for use in making better scheduling decisions for a heterogeneous processor.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
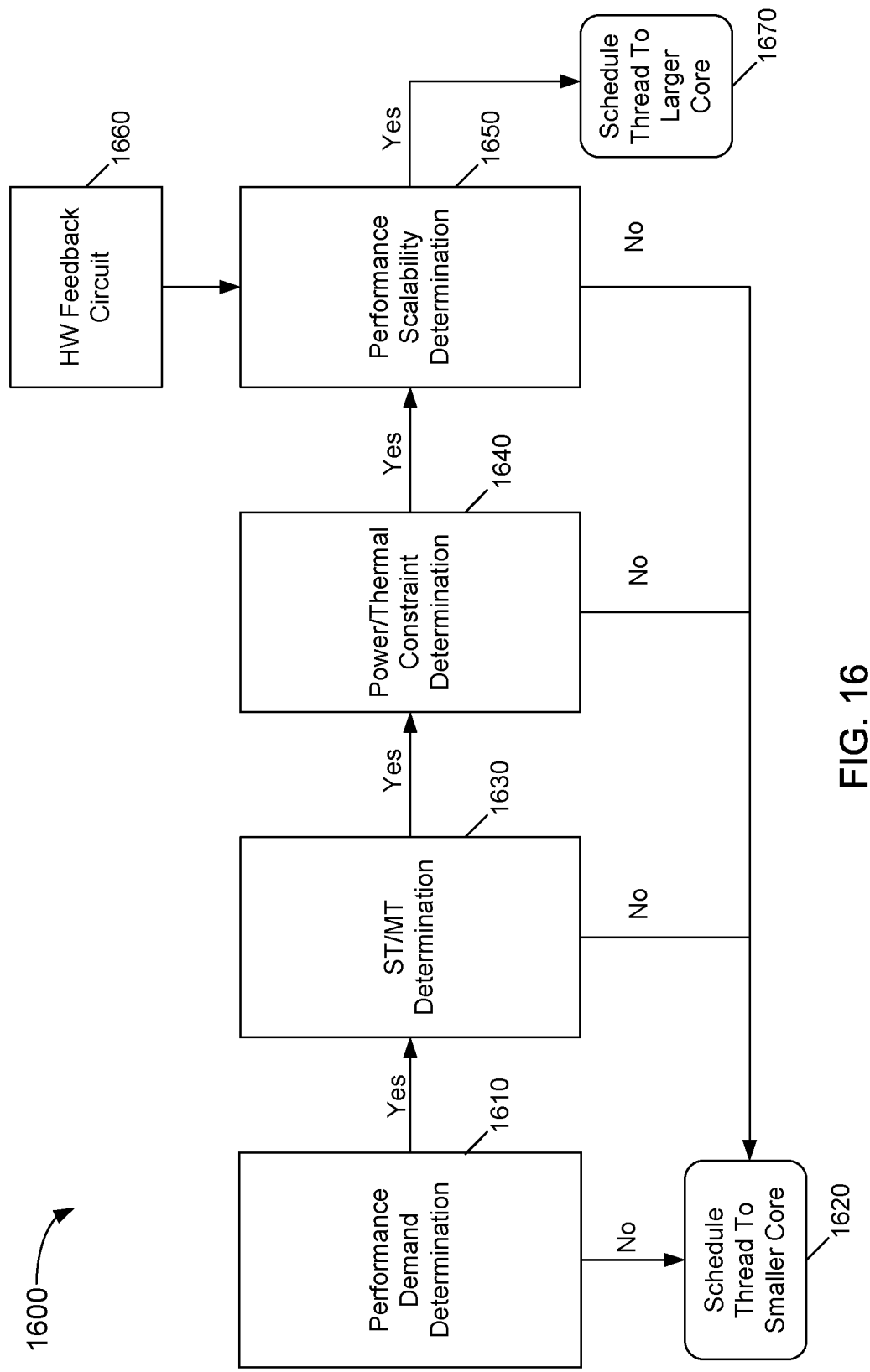
FIG. 16 is a flow diagram of a scheduling method in accordance with an embodiment.

Referring now to FIG. 16, shown is a flow diagram of a scheduling method in accordance with an embodiment. More specifically, scheduling method 1600 may be performed by an OS to schedule workloads on a heterogeneous SoC that includes cores having different capabilities. In embodiments herein, assume that the SoC includes cores of different power consumption levels, such as at least one large core that operates at higher power consumption levels than one or more low power cores that operate at lower power consumption levels. In various embodiments, these different cores may be of heterogeneous designs. For example, the large core or cores may be implemented as out-of-order cores while the low power cores may be implemented as in-order cores. Of course in other embodiments, all the cores may be in-order or out-of-order cores. In other cases, the heterogeneity may be due to process variations across a die on which the SoC is formed. As yet another example, an SoC may have all homogeneous cores but due to power and thermal constraints, the hardware may throttle a subset of cores more than others and thus create performance heterogeneity between otherwise identical cores. In method 1600, all cores are exposed to the OS scheduler, which is responsible for determining which threads are to be scheduled on which core type.

In an embodiment in which there is a limited amount of large cores (e.g., 1), the main goal of heterogeneous scheduling is to boost performance of responsiveness workloads with a dominant thread. Typically, these workloads have multiple active threads running including those performing background or system management tasks. The goal of the scheduler is to identify the most performance-sensitive thread and schedule it on the large core.

Heterogeneous performance and large core usage may be highly dependent on available power and thermal budget. Given package and system constraints, an SoC may be power and thermally limited under many usage conditions. Therefore, the properties of the different core types may be dynamic. Stated another way, a large core may have higher performance than a small core when it is not power or thermally constrained. However, when the core is thermally limited or the SoC is power constrained, the large core performance can be lower than the small core. Heterogeneous scheduling in accordance with an embodiment enables an understanding of these different power and thermal constraints, to enable the scheduler to dynamically determine which core type has higher efficiency and performance at any given point in execution.

Method 1600 may be performed to schedule a thread to a selected core type. As illustrated, method 1600 begins by implementing a performance demand determination (block 1610). This performance demand determination may be based on various information regarding threads, such as utilization information, type of thread (e.g., foreground versus background), latency, priority and so forth. More specifically, the metrics used at block 1610 may include expected thread run time, foreground vs. background activity, thread priority and other special cases such as a low latency profile associated with threads that are known to need responsiveness from the system (e.g., application launch). If based upon the information, it is determined that the given thread is not in need of high performance, control passes to block 1620 where the thread may be scheduled to a smaller (e.g., currently lower power) core as indicated by the hardware feedback.

Otherwise control passes to block 1630 to make a determination of thread dominance. For example, this determination may be whether the thread is a single thread to be in execution or a single dominant thread of an overall workload. If not, control passes to block 1620 for scheduling on a small core. Instead if it is determined that there is a single thread or the thread undergoing scheduling is the dominant thread, control passes to block 1640 to determine whether there is a power and/or thermal constraint on the processor. If so, the thread is scheduled to a low power core (block 1620).

Finally, if it is determined that there is no constraint, control passes to block 1650 where a performance scalability determination may be made. As described herein, this performance scalability determination may be based at least in part on hardware feedback information received from a hardware feedback circuit 1660. In embodiments herein, hardware feedback circuit 1660 may be implemented within a power controller such as a PCU. Of course, the computation of hardware feedback information may be performed in other locations in different embodiments. In any event, at block 1650 a determination as to performance scalability may be made at least in part on this hardware feedback information. If it is determined that the thread is scalable, control passes to block 1670, where it is scheduled to a large (e.g., higher power consuming) core. Otherwise, the thread is scheduled to a lower power core (as currently determined by the hardware feedback) (block 1620). Understand while shown at this high level in the embodiment of FIG. 16, many variations and alternatives of a scheduling method are possible.

In embodiments herein, better scheduling decisions may occur to appropriately schedule threads to achieve higher performance and/or improved power consumption, based on the hardware feedback information. As such, it is possible based upon this hardware feedback information to schedule a thread to a smaller core, where it may achieve greater performance than if it were to be scheduled on a larger core, in some situations. And similarly, it is possible to schedule a thread to a large core and increase energy efficiency, instead of scheduling the thread on a smaller core, in some situations. Note that while only two different core types are described for ease of discussion, in embodiments a given processor or other SoC may include more than two different types of cores that may provide for a range of power consumption levels, compute capacity and so forth.

Figure 17:
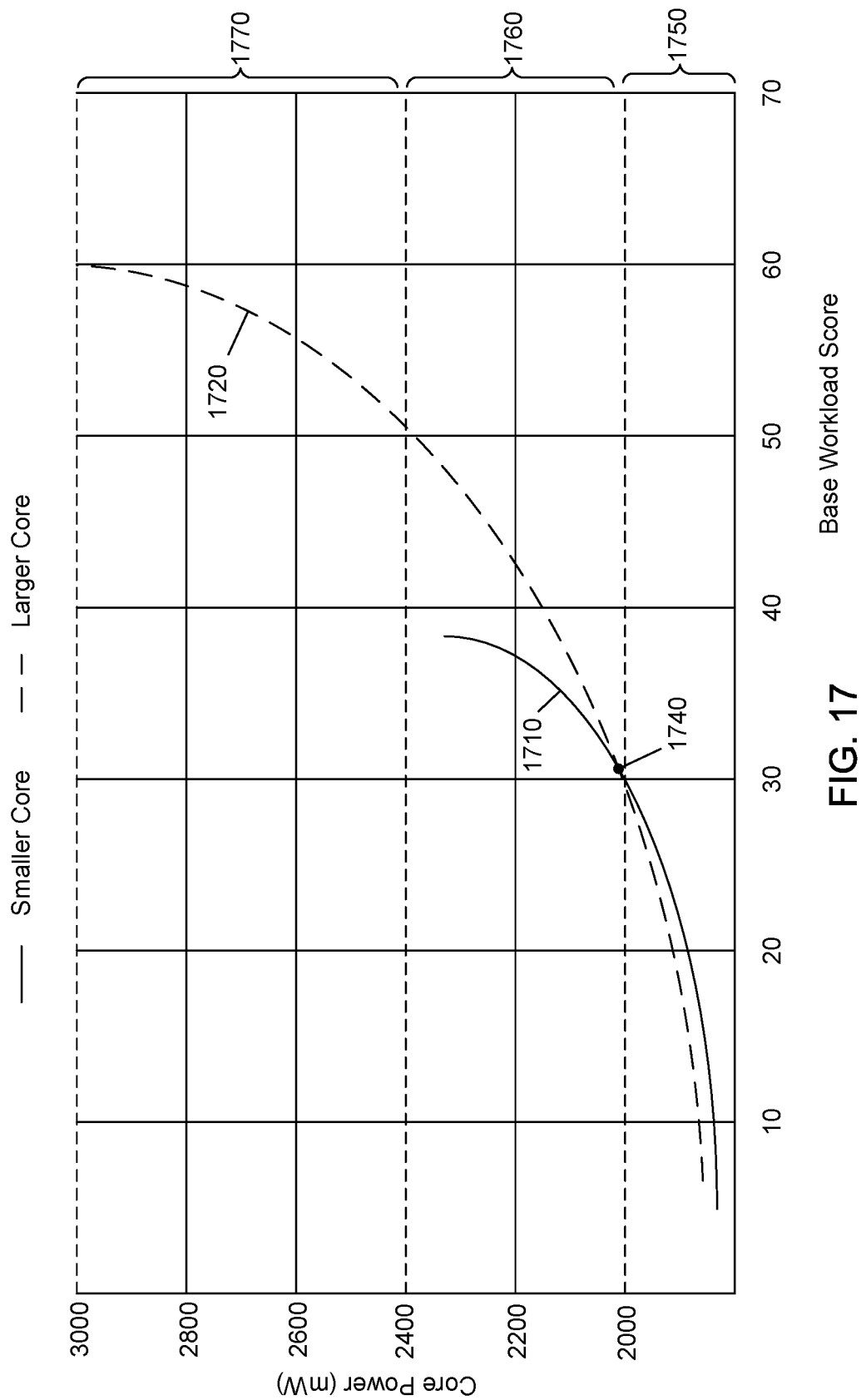
FIG. 17 is a graphical illustration of core power for a variety of workloads, for small and large cores, respectively, in accordance with an embodiment.

Referring now to FIG. 17, shown is a graphical illustration of core power for a variety of workloads, for small and large cores, respectively. As illustrated, curve 1710 is associated with a smaller core and curve 1720 is associated with a larger core. Until a break point 1740, the low power core may execute a given workload at lower power levels than the large core. After break point 1740 however, the smaller core incurs a larger power consumption for less workload output.

More specifically as shown in FIG. 17, in a first region 1750 a low power core may have higher efficiency and performance than a higher power core. Stated another way, in first region 1750, a smaller core is both higher performance and more efficient. Software threads with lower performance requirements that fall into this region may thus be scheduled on smaller cores. In addition, when the SoC is power or thermally limited, a smaller core has higher performance than a larger core. High performance demand software threads may be scheduled on one of the smaller cores in this region. When operating in this region, the OS may schedule work on a larger core only when no other core is available. In a second region 1760, the larger core may have higher efficiency and performance. In second region 1760, a larger core is both higher performance and more efficient than a smaller core, so that in this region, high performance demand threads may be scheduled on a larger core. However, in addition to scheduling performance demand threads on a larger core, other threads that that are to operate in this region may be scheduled on the larger core to improve system efficiency. One example is a graphics workload with a performance requirement that falls in this region. In a third region 1770, the larger core may have higher performance (note that the smaller core cannot operate at the high power level of this third region). In third region 1770, a larger core is higher performance but has lower efficiency than a smaller core. When power/thermal budget is available, a single-threaded (ST)-dominant workload with high performance demand thread may be scheduled on the larger core.

Figure 18:
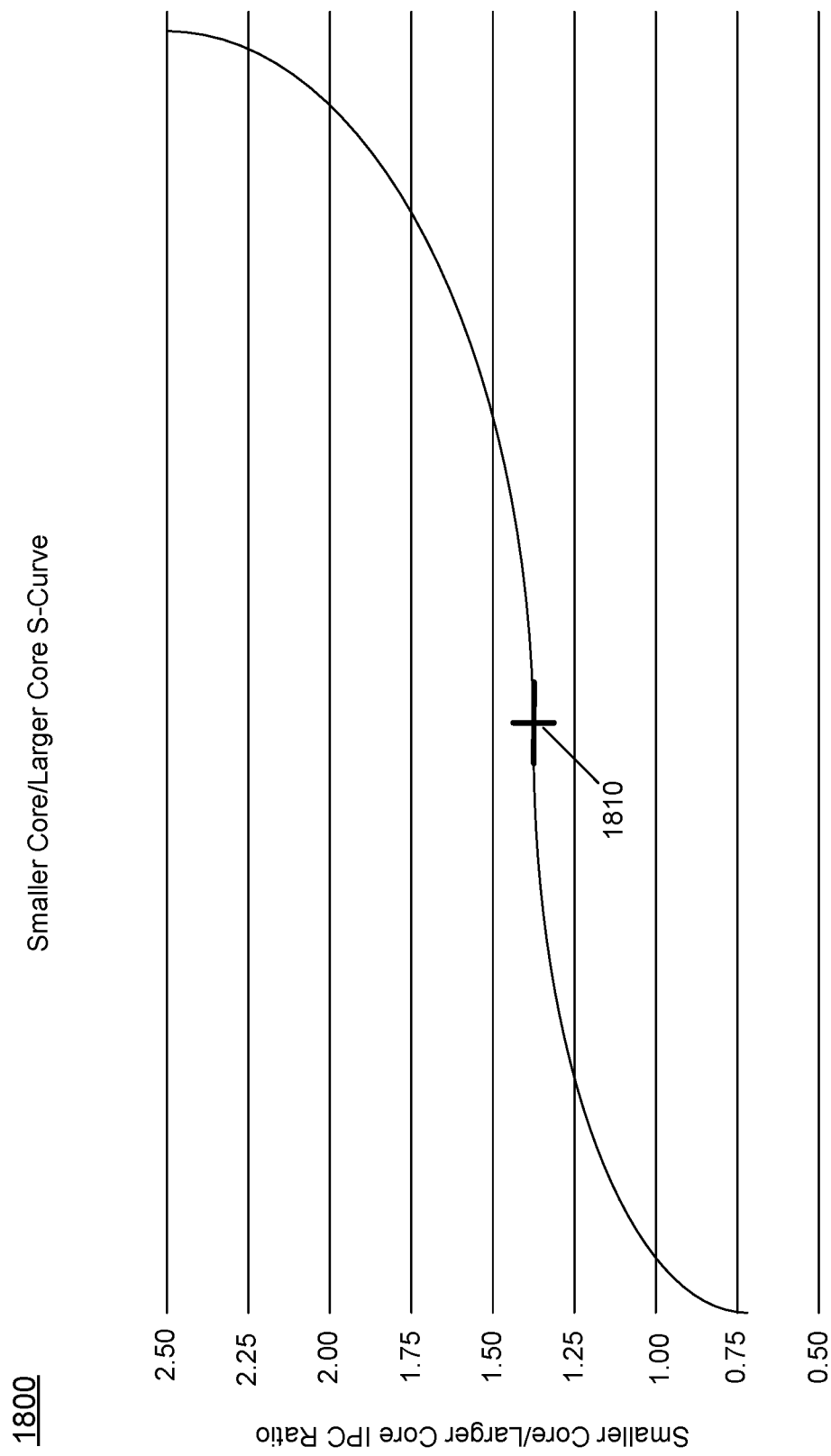
FIG. 18 is a graphical illustration of an S-curve showing a comparison between different core types in accordance with an embodiment.

Referring now to FIG. 18, shown is a graphical illustration of an S-curve showing a comparison between different core types. More specifically, as illustrated in FIG. 18, curve 1800 illustrates a relationship between a performance scalability ratio between a large core and a small core (e.g., in terms of instructions per cycle). As illustrated, at higher workload levels, a higher ratio value is present. Relative performance and efficiency of larger and smaller cores is also workload dependent. It is a function of workload power/performance scalability between larger and smaller cores, the number of active threads in the system and their relative energy-performance priority. Workload scalability in turn defines how workload power and performance (e.g., in terms of IPC) scales between two different core types. Average performance or IPC scaling between larger and smaller cores is 2.0x in illustration 1800. Workloads that have higher performance scalability between larger and smaller will in general move a crossover point 1810 to a lower power envelope while workloads with lower scalability will see crossover between larger and smaller move to higher power levels. The number of active threads and their relative energy-performance priority may determine how available power budget is allocated between different cores and therefore may impact the choice of core type. For example, for a workload with three active threads in which two are background activity and one is performance sensitive foreground activity, more budget may be allocated to a single higher performance core to which the foreground thread is to be scheduled. If all three threads have equal performance demand, power budget allocation between cores may cause scheduling on three small cores.

Figure 19:
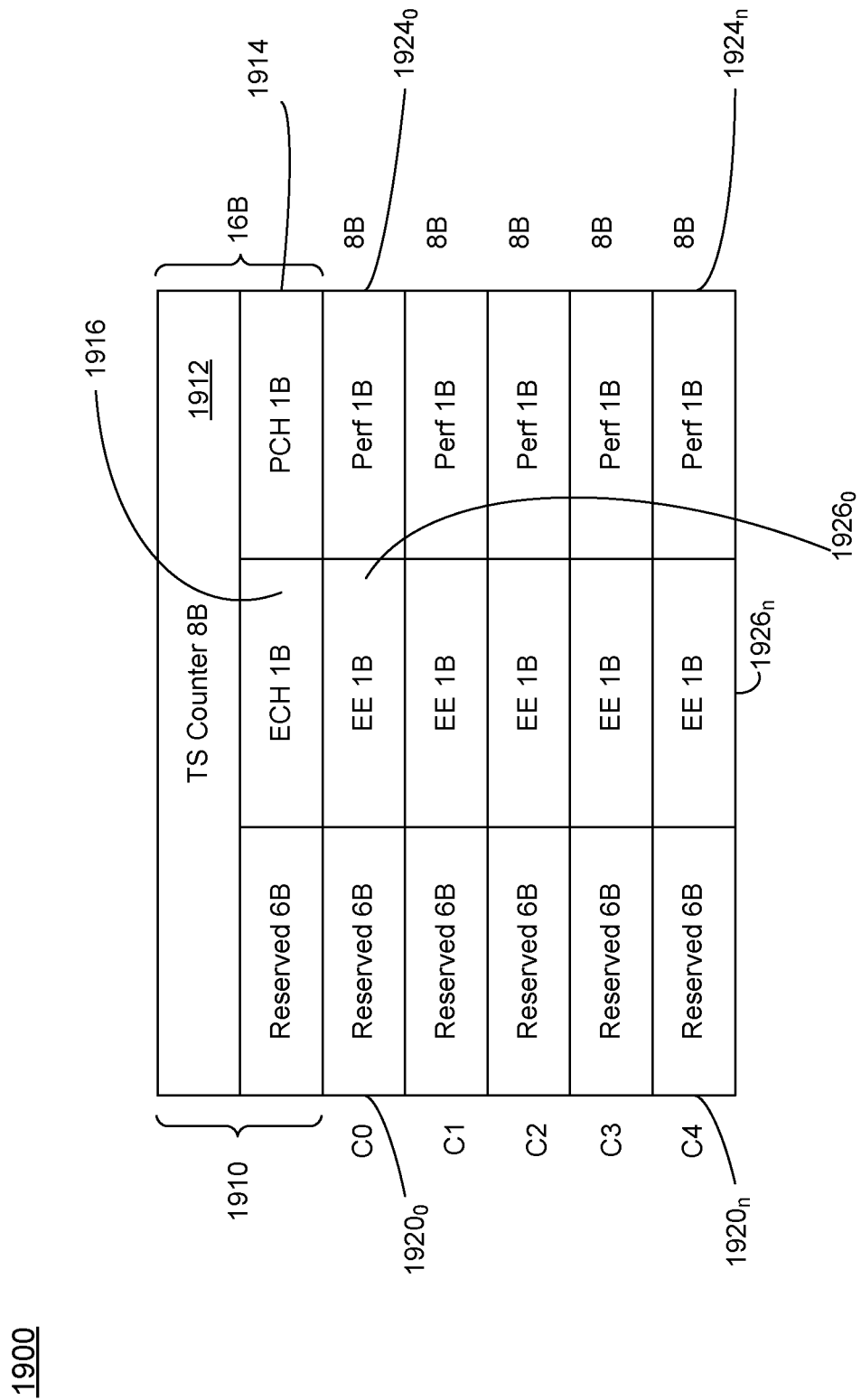
FIG. 19 is a block diagram of a hardware feedback interface structure in accordance with an embodiment.

Referring now to FIG. 19, shown is a block diagram of a hardware feedback interface structure in accordance with an embodiment. More specifically as shown in FIG. 19, structure 1900 is a table or other structure that stores hardware feedback information as described herein. In embodiments, structure 1900 may be a memory-based structure, e.g., stored in a dedicated location within a system memory such as DRAM. In one embodiment, the size of the HFI memory region may be a single 4K memory page, and the OS may allocate one 4 KB page and map it into non-pageable writeback (WB) memory. As illustrated, structure 1900 includes a global portion 1910 that may store information including a timestamp counter 1912 and change indicators. In an embodiment, timestamp counter 1912 may be implemented as an 8 byte (8B) monotonically increasing counter that can be used by the OS to track hardware scheduling updates or for debug purposes. In an embodiment, this counter can be populated with a crystal clock value when the HFI is updated. The OS can convert this counter to a time stamp counter value (TSC) using a given TSC/crystal clock ratio. Also shown, a performance capability changed indicator 1914 and an energy efficient capability change indicator 1916 may be included within global portion 1910. In an embodiment, performance capability changed (PCH) indication 1914 is a 1 bit value that when set to 1 indicates that the performance capability for some core has changed. In an embodiment, energy efficiency capability changed (ECH) indication 1916 is a 1 bit value that when set to 1 indicates that the energy efficiency capability for some core has changed. The rest of the global area may be reserved for future capabilities.

As further illustrated in FIG. 19, structure 1900 also includes a plurality of core-based portions 1920₀-1920ₙ. In an embodiment, each core storage entry 1920 may be associated with a given logical processor and may store information including a corresponding performance capability 1924 and a corresponding energy efficiency capability 1926 for the corresponding core. In an embodiment, each core storage entry 1920 may be an 8 byte entry including the following fields for each physical core: performance (Perf) (1B), namely the current performance capability of a logical processor; energy efficiency (EE) (1B), namely the current energy efficiency capability of a logical processor; and a reserved portion.

In an embodiment, the hardware feedback interface is memory based. During initialization, the OS may enumerate hardware feedback support. If hardware feedback is supported, the OS allocates a hardware feedback interface (HFI) memory region as a non-paged contiguous memory. Once this memory region is allocated, the OS writes its physical address (PA) in a pointer register, and updates indicators in various registers (such as one or more model specific registers (MSRs)) to cause the hardware to begin hardware feedback operation as described herein.

Once hardware feedback is enabled, a power controller generates hardware feedback information updates based on system workload and power and thermal constraints. In one embodiment, a microcode technique may be used to write the updates to memory, which may be in a compressed form as described herein. When new hardware feedback information is available, the power controller may use a mailbox interface to request microcode to update the HFI memory region with the latest hardware scheduling information. Microcode reads the new information and writes it to memory using the layout of the HFI region. In another embodiment, the power controller may write the memory directly. A still further embodiment may be where the HFI table is located in a set of memory mapped control registers (e.g., within the power controller).

Various package level status/interrupt MSRs may be used to control access to the HFI memory region and OS notifications. In an embodiment, a hardware feedback notification log indicator of a package thermal status MSR may be used to control access to HFI memory and provide the OS with status of hardware feedback updates. This indicator may be set by hardware when a change to the hardware feedback information has occurred and been written to memory. This set indicator is to inform the OS of an atomic update to the HFI memory region, and that it will not be written to again until the OS clears the indicator.

When the hardware feedback notification log indicator is set, the OS can access the memory region to obtain new hardware feedback information. The OS then clears this indicator after reading HFI memory so that a new power or energy efficiency order change will cause the power controller to update the HFI memory and set this indicator again. When this indicator is cleared, hardware owns the hardware feedback memory region and information stored there is not guaranteed to be atomic or consistent. As such, the OS may not read or access HFI memory when the hardware feedback notification log indicator is cleared. In some embodiments, hardware feedback updates may be controlled to occur no more than once per given interval (e.g., 10 ms) and only when hardware feedback has meaningfully changed.

In embodiments, notification events may be provided to notify the OS that there is a change to hardware feedback processor capabilities and a new update to HFI memory region is available. As one example mechanism, a hardware feedback notification enable indicator may be included in a package thermal interrupt MSR to enable hardware feedback notifications. When this indicator is set, a hardware feedback notification is generated when the hardware feedback notification log indicator in the package thermal status MSR changes polarity. Note that the OS can use the hardware feedback notification log indicator for flow control. If hardware feedback updates and notifications are too frequent for the OS to process and use for scheduling, the OS can delay clearing the hardware feedback notification log indicator, thus preventing further hardware feedback updates and notifications.

The per logical processor capability information may be accessed based on enumeration through a mechanism like a CPUID register to identify the index of logical processor's entry or row in the HFI memory containing processor capability information. The OS uses this index to create a mapping between logical processor IDs and indexes into hardware feedback capability information.

In operation, the OS may clear the hardware feedback notification log indicator in the package thermal status MSR to request a hardware feedback update and set hardware feedback notification enable indicator in the package thermal interrupt MSR if it wants to receive hardware feedback notifications. Once the status and notification indicators are set, the OS sets an enable indicator in a hardware feedback configuration MSR. This set indicator is a trigger to cause hardware to begin computing hardware feedback as described herein. When a change in one of the processor capabilities occurs, the power controller updates the HFI memory region pointed to by the hardware feedback pointer MSR and generates a notification to the OS.

Figure 20:
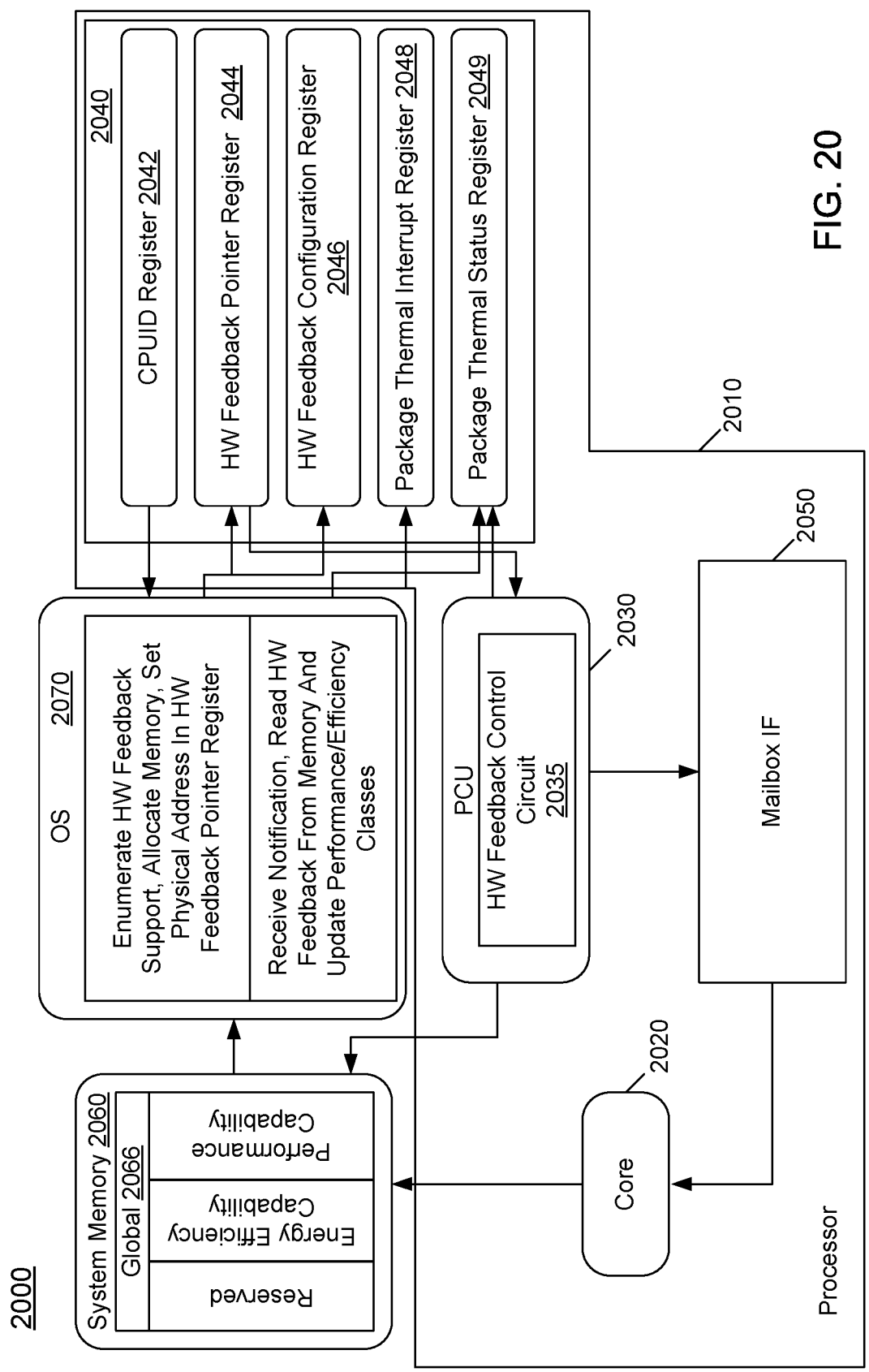
FIG. 20 is a block diagram of a system arrangement in accordance with an embodiment.

Referring now to FIG. 20, shown is a block diagram of a system arrangement in accordance with an embodiment. As illustrated in FIG. 20, system 2000 includes a processor 2010 which may be, in an embodiment, a heterogeneous multicore processor that couples to a system memory 2060 implemented as a DRAM, in one embodiment. As further illustrated, an OS 2070 executes on processor 2010. Processor 2010 includes at least a single core 2020 shown for representative purposes. Core 2020 couples to a PCU 2030 via a mailbox interface 2050 which, in an embodiment may be implemented as a microcode mailbox interface. Of course other interfaces to enable communication between core 2020 and PCU 2030 are possible.

As further illustrated, processor 2010 also includes a set of registers 2040. Registers 2040 may include a variety of MSRs, status registers, configuration registers and so forth. In the particular embodiment shown in FIG. 20, such registers include a CPUID register 2042. Of interest, CPUID register 2042 may include a hardware feedback field which when set indicates that the processor is capable of providing dynamic hardware feedback information to an OS. A hardware feedback pointer MSR 2044 may include a hardware feedback pointer field to store a pointer, written by the OS, to point to the location in memory in which the hardware feedback information structure is to be stored. A hardware feedback configuration MSR 2046 may store a hardware feedback configuration enable field which, when set, indicates that the processor is to perform hardware feedback processing as described herein. A package thermal interrupt register 2048 may include a hardware feedback notification enable indicator to enable triggering of an interrupt in response to an update to the hardware feedback information. And finally, a package thermal status register 2049 may include a hardware feedback notification log indicator, which may be set when updated hardware feedback information is written by PCU 2030, and may be reset by the OS when it reads the updated information.

Still with reference to FIG. 20, PCU 2030 includes a hardware feedback control circuit 2035 which may compute hardware feedback information and trigger a writing of this information to memory 2060. More specifically, this information may be communicated via mailbox interface 2050 to core 2020. In turn, microcode of core 2020 may receive this hardware feedback information and write it to system memory 2060 and thereafter send an acknowledgement to PCU 2030 of the writing of this information.

Note that in other embodiments, a direct interface may be provided to enable PCU 2030 to directly write this hardware feedback information to system memory 2060. In embodiments, prior to actually being written to memory, the hardware feedback information may be temporarily cached as writeback information, e.g., in a last level cache of the processor. As such, OS 2070 may access the hardware feedback information either from the LLC if present therein or from memory 2060. Understand while shown at this high level in the embodiment of FIG. 20, many variations and alternatives are possible.

Figure 21:
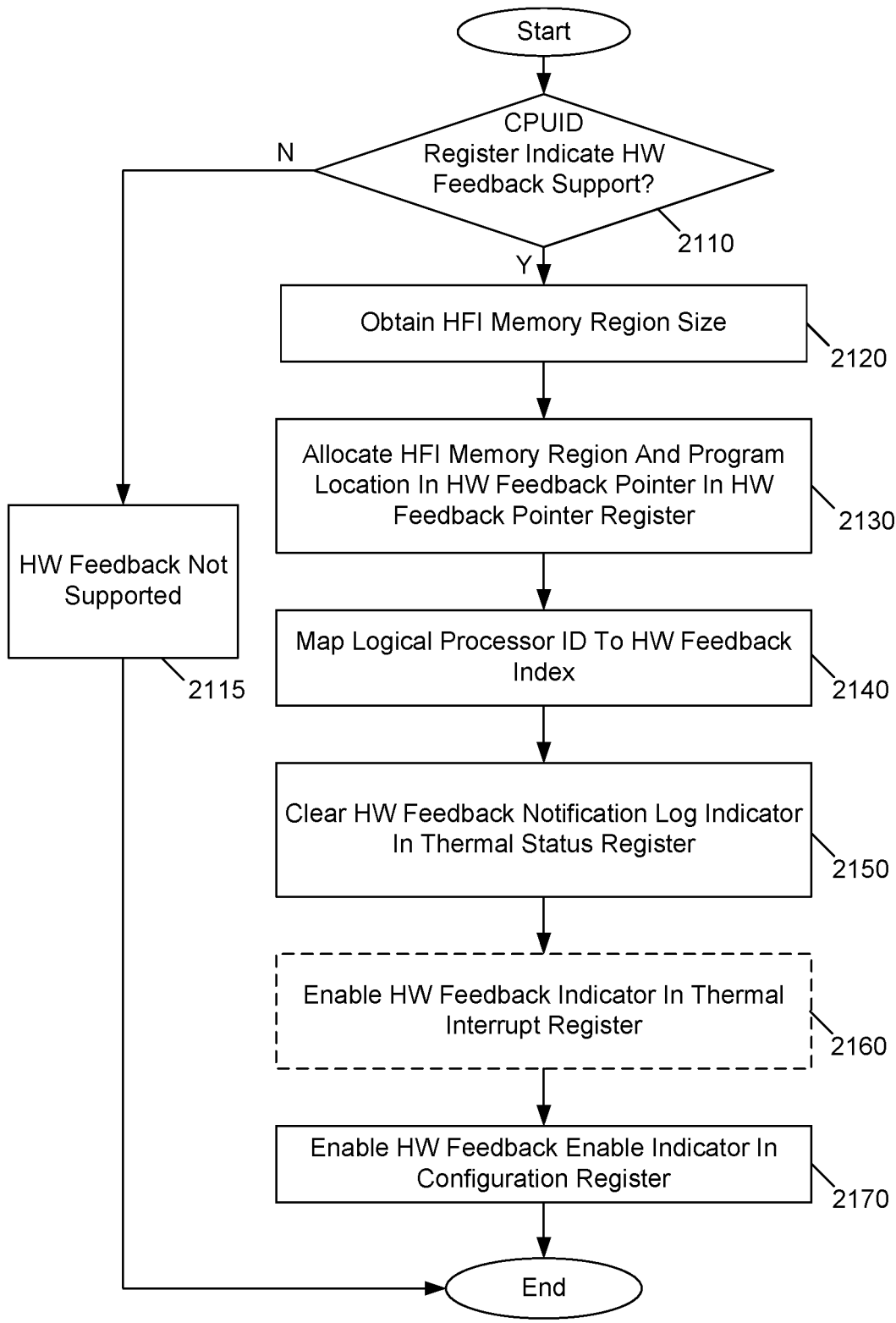
FIG. 21 is a flow diagram of a method in accordance with an embodiment.

Referring now to FIG. 21, shown is a flow diagram of a method in accordance with an embodiment. More specifically, as shown in FIG. 21 method 2100 is a method for performing a hardware feedback initialization process. In one embodiment, method 2100 may be performed by an OS in execution on a processor. It begins by determining whether hardware feedback support is present in the processor (diamond 2110). In an embodiment, this determination may be based upon an indication in identification register such as a CPUID register. If this determination is in the negative, control passes to block 2115 where the OS determines that hardware feedback is not supported, and as such the initialization method concludes.

Instead if it is determined that hardware support is present, control passes to block 2120, where a HFI memory region size may be obtained. In an embodiment, this information may be obtained from an identification register, e.g., the same or another CPUID register. Still with reference to FIG. 21, control passes to block 2130 where this hardware feedback information memory region may be allocated in the location programmed. More specifically in an embodiment, an OS may write a hardware feedback pointer in a hardware feedback pointer register. Next, control passes block 2140 where the mapping of a logical processor ID to a hardware feedback information index may be performed. In this way, each core (or other logical processor) can be associated with a hardware feedback index, such that during operation the hardware feedback information for a given processor may be obtained.

Still reference to FIG. 21, control next passes to block 2150 where the OS may clear a hardware feedback notification log indicator in a thermal status register. By way of clearing this indicator, the hardware can determine that it is able to write the hardware feedback information to the hardware feedback memory.

Control next passes to optional block 2160 where a hardware feedback indicator may be enabled in thermal interrupt register. That is, in an embodiment in which the OS desires to receive an interrupt to indicate that new hardware feedback information is available, this enable indicator is set. Finally, control passes to block 2170 where a hardware feedback enable indicator may be enabled in a hardware feedback configuration register so that the processor hardware can begin hardware feedback updates. Although shown at this high level in the embodiment of FIG. 21, many variations and alternatives are possible.

Figure 22:
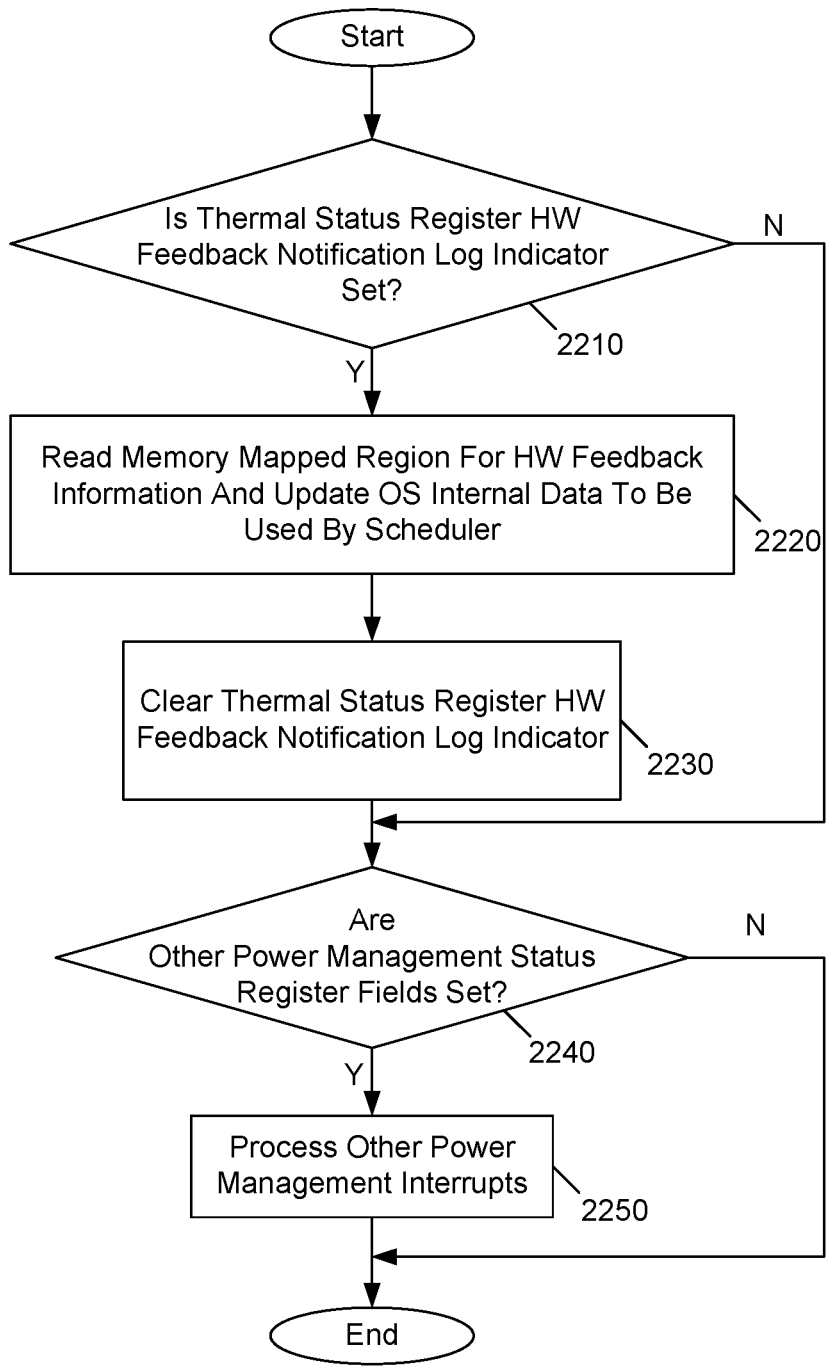
FIG. 22 is a flow diagram of another embodiment of the present invention.

Referring now to FIG. 22, shown is a flow diagram of a method in accordance with another embodiment of the present invention. More specifically method 2200 of FIG. 22 is a method for performing interrupt processing for handling hardware feedback information as described herein. In this hardware feedback OS notification flow, after the OS receives a notification event, it checks the hardware feedback notification log indicator in the thermal status MSR to determine if the notification event was generated due to a hardware feedback update. If so, the hardware has updated one or more processor capability vectors. At this point, the OS reads the HFI memory region and updates its local scheduling structure with the latest hardware feedback using internal logical processor-to-hardware feedback mapping. As described above, this mapping is created and maintained by the OS during initialization. After the OS updates its internal processor capabilities, this information is used for OS scheduling decisions. The OS next clears the scheduling feedback notification log indicator in the thermal status MSR to enable another hardware scheduling update to occur.

In an embodiment, method 2200 may be performed by the OS in execution on a processor as described herein. As illustrated, method 2200 begins by determining whether a hardware feedback notification log indicator of a thermal status register is set (diamond 2210). If so, control passes to block 2220, where the OS may read a memory-mapped region to obtain hardware feedback information. As described herein, this hardware information may be present in a cache hierarchy of the processor or in system memory. In any event, the OS that reads this updated hardware feedback information may update one or more OS internal data structures. More specifically, such data structures may be used by the OS scheduler to schedule threads for execution within the processor. Control next passes to block 2230 where the hardware feedback notification log indicator of the thermal status register is cleared. By way of this mechanism, the OS thus indicates to the hardware that it has read the last update of the hardware feedback information and as such, as a new update becomes available, the hardware may provide it to memory to again be read by the OS.

Still with reference to FIG. 2200, at diamond 2240 it is determined whether additional power management status register fields are set. The OS may check all status bits for events for which thermal notification was enabled. If there are other events, control passes to block 2250 where such other power management interrupts may be processed. Although the scope of the present invention is not limited in this regard, in one particular embodiment another interrupt may be a hardware P-state interrupt to indicate that hardware has autonomously updated a performance state of one or more cores of the processor. Of course, other power management interrupts may occur in different embodiments. While shown at this high level in the embodiment of FIG. 22, many variations and alternatives are possible.

Figure 23:
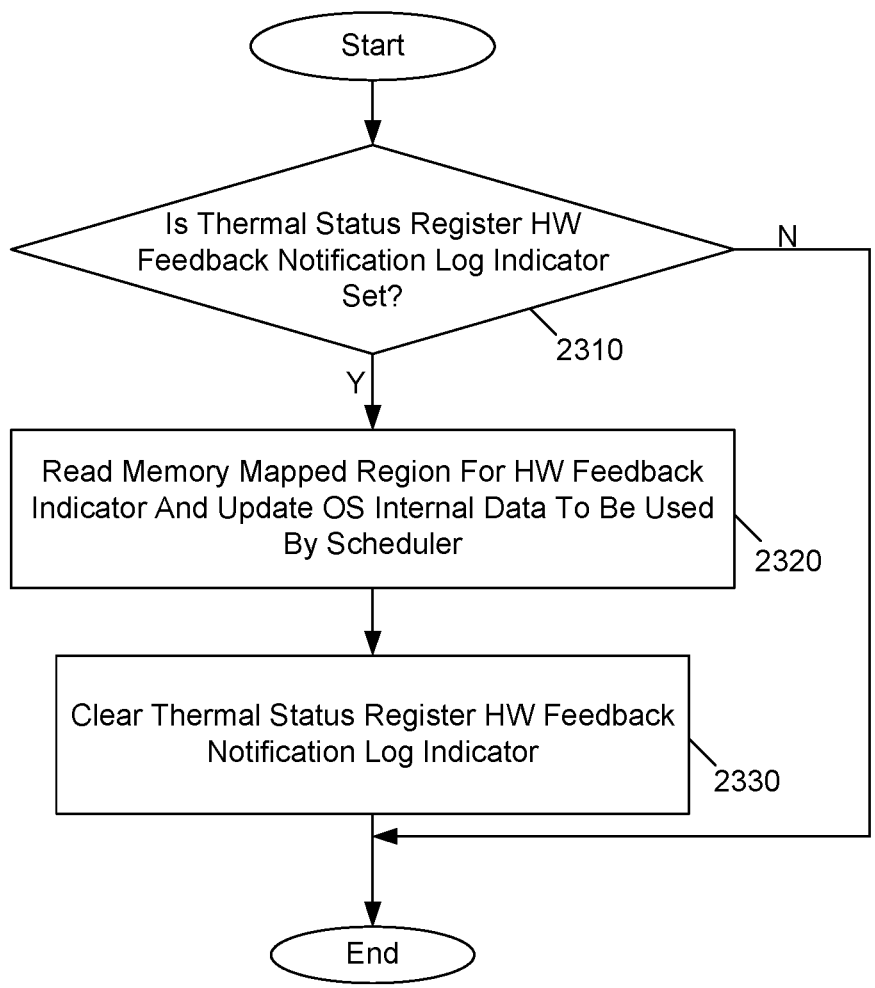
FIG. 23 is a flow diagram of a method in accordance with a still further embodiment of the present invention.

In other cases, instead of an interrupt-based mechanism to identify the presence of updated hardware feedback information, a polling process may occur. Referring now to FIG. 23, shown is a flow diagram of a method in accordance with a still further embodiment of the present invention. In this hardware feedback OS polling flow, an operating system may choose not to use hardware feedback notifications for updates (e.g., due to interrupt processing overhead). In this case, the OS may check the hardware feedback notification log indicator in the thermal status MSR to determine if hardware generated new hardware feedback. The OS can perform this check periodically (e.g., every 30 ms) or use some other trigger to determine if new hardware feedback information is available. The rest of the flow is similar to the case when notifications are enabled. When the hardware feedback notification log indicator in the thermal status MSR is set, the OS reads the memory-mapped HFI region and clears this indicator to receive new updates. Note when the hardware feedback notification log indicator in the thermal status MSR is cleared, hardware writes new processor capability vectors whenever there is a meaningful change from a previous update. Once this HFI memory region is updated, hardware sets the hardware feedback notification log indicator in the thermal status MSR and will not generate any more updates until it is cleared again. Therefore, an OS that uses polling to receive hardware feedback may obtain stale processor capability information.

As shown in FIG. 23, method 2300 is a method for polling for hardware feedback information as described herein. In an embodiment, method 2300 may be performed by the OS in execution on a processor as described herein. As illustrated, method 2300 begins by determining whether a hardware feedback notification log indicator of a thermal status register is set (diamond 2310). If so, control passes to block 2320 where the OS reads the updated hardware information from the memory-mapped region, and updates one or more OS internal data structures. Next at block 2330, the OS clears the hardware feedback notification log indicator of the thermal status register to indicate to the hardware that it has read the last update of the hardware feedback information.

In some cases, the OS may seek to disable the hardware feedback information techniques described herein. For example, such disabling may be initiated when some type of memory issue is occurring, and/or when the OS seeks to reclaim this HFI memory. The OS may be configured to reclaim HFI memory only after it ensures that the power controller does not have any pending memory updates in progress.

Figure 24:
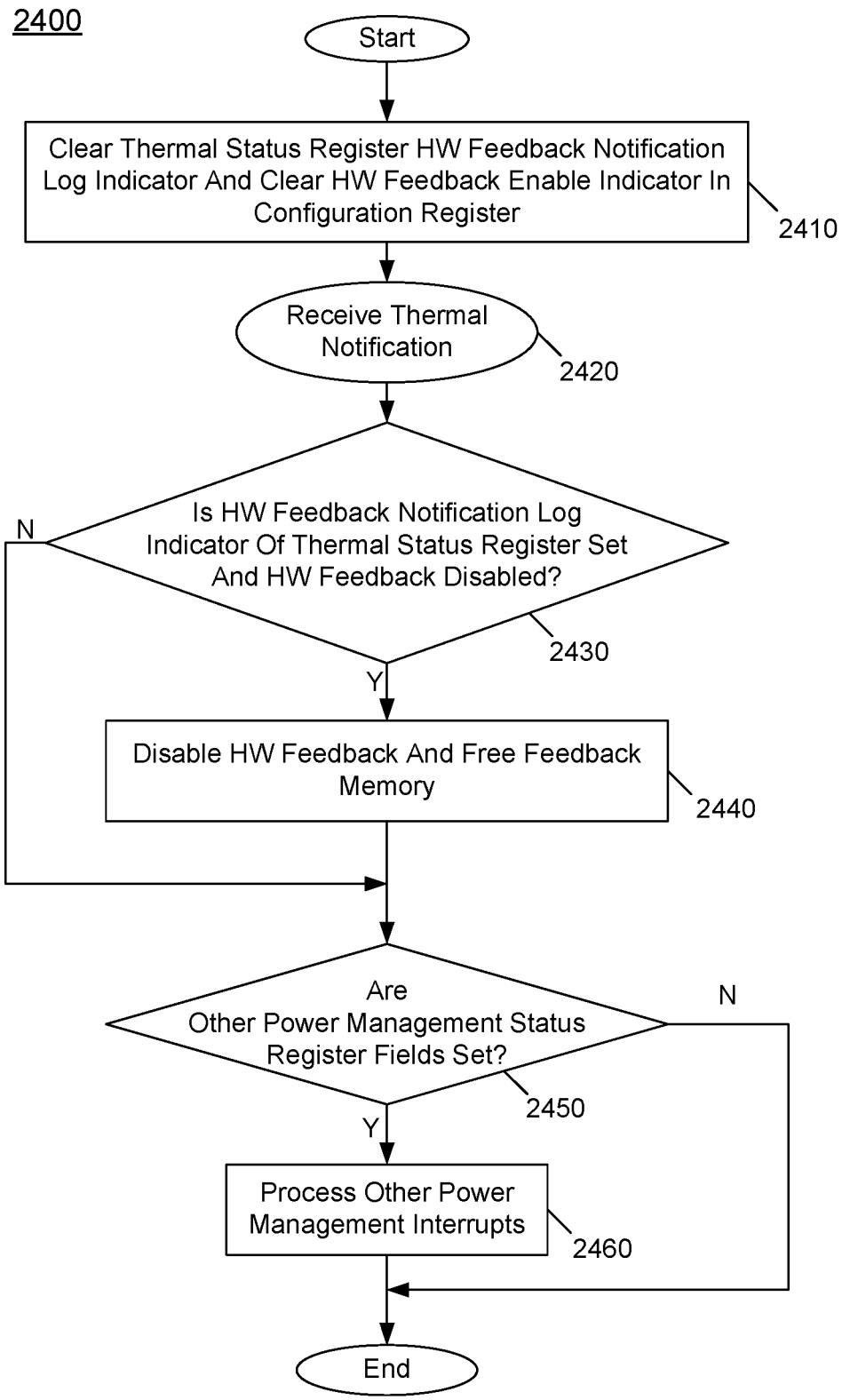
FIG. 24 is a flow diagram of a method in accordance with another embodiment of the present invention.

Referring now to FIG. 24, shown is a flow diagram of a method in accordance with another embodiment of the present invention. As shown in FIG. 24, in an OS disable flow, if the OS wants to disable the hardware feedback interface it clears an enable indicator in a hardware feedback configuration MSR and hardware feedback notification log indicator in the thermal status MSR. The power controller checks the enable indicator and when it changes to disabled, it stops all HFI memory updates and sets the hardware feedback notification log indicator in the thermal status MSR, so that hardware feedback is disabled, and the OS can reclaim HFI memory.

Thus as illustrated, method 2400 begins by clearing a hardware feedback notification log indicator within the thermal status register and clearing an enable indicator of the hardware feedback configuration register, which may cause the hardware feedback mechanism to be disabled (block 2410). Next, control passes to block 2420 where a thermal notification is received. Next, it is determined at diamond 2430 whether the hardware feedback notification log indicator of the thermal status register is set, and the hardware feedback is disabled. If so, control passes to block 2440 where the hardware feedback mechanism is thus disabled, and the feedback memory is freed, such that the OS may allocate this memory to another use. Still further as shown in FIG. 24, at diamond 2450 it is determined whether additional power management status register fields are set. If so, control passes to block 2460 where such other power management interrupts may be processed.

Figure 25:
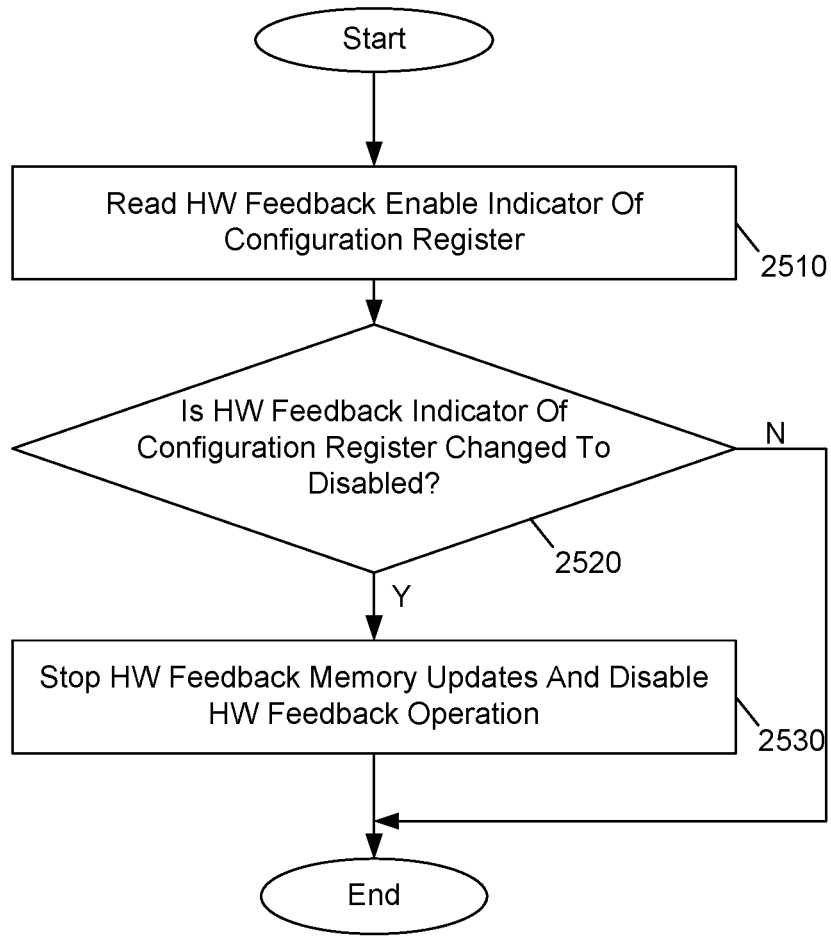
FIG. 25 is a flow diagram of a method for disabling hardware feedback information in accordance with an embodiment.

Referring now to FIG. 25, shown is a flow diagram of a method for disabling hardware feedback information in accordance with an embodiment. More specifically, method 2500 shows a method performed by a PCU or other power controller to cause this mechanism to be disabled, e.g. under control of the OS. As illustrated, method 2500 begins by reading a hardware feedback enable indicator of a configuration register (block 2510). Then it may be determined whether this indicator has changed to a disabled state (diamond 2520). If so, control passes to block 2530 where the PCU may stop hardware feedback memory updates and disable the hardware feedback mechanism described herein. Although shown at this high level in the embodiment of FIG. 25, many variations and alternatives are also possible.

In an embodiment, a hardware feedback configuration MSR as in Table 1 is used by the OS to enable hardware feedback. When the enable indicator is set, the processor provides hardware feedback to the OS. Once set, writes to this register are ignored. The enable indicator is cleared at reset.

TABLE 1

IA32_hardware feedback configuration PKG MSR

| Field | R/W | Definition | Bits | Width |
|---|---|---|---|---|
| Enable | R/W | Enable HW Scheduling Feedback | 0 | 1 |

In an embodiment, a package thermal status MSR as in Table 2 includes a hardware feedback notification log indicator to indicate when a hardware feedback update has occurred. The OS clears this indicator to allow additional hardware feedback updates and notifications. When it is cleared, hardware owns the hardware feedback memory region and information stored there is not to be read or accessed by the OS. The OS can access this MSR only when the enable indicator in the hardware feedback configuration MSR is set.

TABLE 2

IA32_package thermal status PKG MSR

| Field | R/W | Definition | Bits | Width |
|---|---|---|---|---|
| ... | ... | ... | ... | ... |
| HW Feedback Notification Log | R/WC0 | R/WC0 - Sticky bit that indicates whether HW Feedback change has occurred (e.g., due to power/ thermal limits) since the last clearing of this bit or reset. Software may clear this bit by writing a zero (0). | 26 | 1 |

A hardware feedback notification enable indicator in a package thermal interrupt MSR as in Table 3 is used to enable thermal notifications when hardware has updated its processor capability vectors in the HFI memory region. After a notification occurs, the OS clears the hardware feedback notification log indicator in the package thermal status MSR to allow additional notifications.

TABLE 3

IA32_package thermal interrupt PKG MSR

| Field | R/W | Definition | Bits | Width |
|---|---|---|---|---|
| ... | ... | ... | ... | ... |
| HW Feedback Notification Enable | R/W | Enables the generation of an interrupt when a HW Feedback change occurs (e.g., due to thermal/power limits). | 25 | 1 |

A hardware feedback pointer MSR as in Table 4 contains the physical address of the hardware feedback memory region. This package-level MSR stores a physical address that is 4 KB aligned. The valid bit indicates if the physical address is valid. This MSR is accessed by a power controller and/or microcode to obtain the hardware feedback physical memory address.

TABLE 4

IA32_hardware feedback pointer PKG MSR

| Field | R/W | Definition | Bits | Widths |
|---|---|---|---|---|
| Valid | R/W | Set by OS to mark MSR valid | 0 | 1 |
| Reserved | R/W | Reserved. Must be 0 | 11:1 | 11 |
| Table Address | R/W | Physical address of the table | Max_PA-1:12 | N |

The following examples pertain to further embodiments.

In one example, a processor includes: a plurality of cores to execute instructions; a first identification register having a first field to store a feedback indicator to indicate to an OS that the processor is to provide hardware feedback information to the OS dynamically; and a power controller coupled to the plurality of cores. The power controller may include a feedback control circuit to dynamically determine the hardware feedback information for at least one of the plurality of cores and inform the OS of an update to the hardware feedback information.

In an example, the feedback control circuit is to dynamically determine the hardware feedback information comprising a current performance capability of the at least one of the plurality of cores and a current energy efficiency capability of the at least one of the plurality of cores.

In an example, the current performance capability comprises a relative value based in part on a performance state of the at least one of the plurality of cores, and the current energy efficiency capability comprises a relative value based in part on a performance metric of the at least one of the plurality of cores.

In an example, the power controller is to dynamically determine the hardware feedback information based at least in part on a workload and one or more of a power constraint on the processor and a thermal constraint on the processor.

In an example, the power controller comprises a plurality of memory mapped registers to store the hardware feedback information.

In an example, the processor is to store the hardware feedback information to a hardware feedback structure of a system memory coupled to the processor.

In an example, the hardware feedback structure comprises a global portion to store at least one timestamp value to indicate a time at which updated hardware feedback information is stored and change indicators to indicate whether the hardware feedback information for a corresponding one of the plurality of cores has been updated, and a local portion including a plurality of fields, each associated with one of the plurality of cores and to store the hardware feedback information for the corresponding core.

In an example, the processor further comprises a pointer register to store a pointer to the hardware feedback structure, the OS to allocate the hardware feedback structure and write the pointer to the pointer register.

In an example, the processor further comprises a second register to store a hardware feedback notification indicator, where the power controller is to set the hardware feedback notification indicator to inform the OS regarding the update to the hardware feedback information.

In an example, the processor further comprises a third register to store a hardware feedback notification enable indicator, where in response to a first state of the hardware feedback notification enable indicator, the power controller is to cause an interrupt to be generated in response to the update to the hardware feedback information.

In an example, the plurality of cores comprises at least one core to execute at a first power consumption level and one or more second cores to execute at a second power consumption level, the second power consumption level lower than the first power consumption level.

In another example, a method comprises: allocating a hardware feedback structure in a system memory and storing a pointer to the hardware feedback structure in a first register of a processor, the hardware feedback structure to store hardware feedback information comprising dynamic performance and energy efficiency capabilities of a plurality of cores of the processor; resetting a hardware feedback indicator of a status register of the processor to indicate to a power controller of the processor that an update to the hardware feedback information provided from the power controller to a scheduler can be effected; and updating a configuration register of the processor to enable the power controller to dynamically calculate the hardware feedback information.

In an example, the method further comprises mapping a first logical processor identifier associated with a first logical processor to a first entry of the hardware feedback structure, the first entry to store hardware feedback information associated with the first logical processor.

In an example, the method further comprises: reading the update to the hardware feedback information from the first entry; updating a scheduling structure based at least in part on the update; and scheduling at least one thread to the first logical processor using information stored in the scheduling structure.

In an example, the method further comprises resetting the hardware feedback indicator of the status register after reading the update.

In an example, the method further comprises setting a hardware feedback notification indicator of an interrupt register of the processor to cause an interrupt in response to the update to the hardware feedback information.

In an example, the method further comprises disabling the power controller from updating the hardware feedback information, via a second update to the configuration register.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises a processor having: a first core to execute instructions; a plurality of second cores to execute instructions, the plurality of second cores heterogeneous to and smaller than the first core; a shared cache memory; a power controller coupled to the first core and the plurality of second cores, the power controller including a feedback control circuit to dynamically determine hardware feedback information for one or more of the first core and the plurality of second cores based at least in part on a workload and one or more of a thermal constraint and a power constraint; a status register having a first field to store a first indicator, where when the first indicator of the status register is of a first state, the feedback control circuit is to write an update to the hardware feedback information; and an interrupt register having a first field to store a first indicator, where when the first indicator of the interrupt register is of the first state, the processor is to issue an interrupt in response to the update to the hardware feedback information. The system may further include a system memory coupled to the processor, the system memory comprising a hardware feedback structure to store the hardware feedback information.

In an example, a scheduler is to schedule a first thread on a second core of the plurality of second cores when a current performance capability and a current energy efficiency capability of the second core are greater than a current performance capability and a current energy efficiency capability of the first core.

In an example, the feedback control circuit is to write the update to the hardware feedback information to the shared cache memory and the scheduler is to access hardware feedback information from the shared cache memory, the shared cache memory to write back the update of the hardware feedback information to the hardware feedback structure.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores to execute instructions;
   a first identification register having a first field to store a feedback indicator to indicate to an operating system (OS) that the processor is to provide hardware feedback information to the OS dynamically; and
   a power controller coupled to the plurality of cores, the power controller including a feedback control circuit to dynamically determine the hardware feedback information for at least one of the plurality of cores and inform the OS of an update to the hardware feedback information.

2. The processor of claim 1, wherein the feedback control circuit is to dynamically determine the hardware feedback information comprising a current performance capability of the at least one of the plurality of cores and a current energy efficiency capability of the at least one of the plurality of cores.

3. The processor of claim 2, wherein the current performance capability comprises a relative value based in part on a performance state of the at least one of the plurality of cores, and the current energy efficiency capability comprises a relative value based in part on a performance metric of the at least one of the plurality of cores.

4. The processor of claim 2, wherein the power controller is to dynamically determine the hardware feedback information based at least in part on a workload and one or more of a power constraint on the processor and a thermal constraint on the processor.

5. The processor of claim 1, wherein the power controller comprises a plurality of memory mapped registers to store the hardware feedback information.

6. The processor of claim 1, wherein the processor is to store the hardware feedback information to a hardware feedback structure of a system memory coupled to the processor.

7. The processor of claim 6, wherein the hardware feedback structure comprises a global portion to store at least one timestamp value to indicate a time at which updated hardware feedback information is stored and change indicators to indicate whether the hardware feedback information for a corresponding one of the plurality of cores has been updated, and a local portion including a plurality of fields, each associated with one of the plurality of cores and to store the hardware feedback information for the corresponding core.

8. The processor of claim 6, further comprising a pointer register to store a pointer to the hardware feedback structure, the OS to allocate the hardware feedback structure and write the pointer to the pointer register.

9. The processor of claim 1, further comprising a second register to store a hardware feedback notification indicator, wherein the power controller is to set the hardware feedback notification indicator to inform the OS regarding the update to the hardware feedback information.

10. The processor of claim 9, further comprising a third register to store a hardware feedback notification enable indicator, wherein in response to a first state of the hardware feedback notification enable indicator, the power controller is to cause an interrupt to be generated in response to the update to the hardware feedback information.

11. The processor of claim 1, wherein the plurality of cores comprises at least one core to execute at a first power consumption level and one or more second cores to execute at a second power consumption level, the second power consumption level lower than the first power consumption level.

12. At least one non-transitory computer readable storage medium having stored thereon instructions, which if performed by a system cause the system to perform a method comprising:
   allocating a hardware feedback structure in a system memory and storing a pointer to the hardware feedback structure in a first register of a processor, the hardware feedback structure to store hardware feedback information comprising dynamic performance and energy efficiency capabilities of a plurality of cores of the processor;
   resetting a hardware feedback indicator of a status register of the processor to indicate to a power controller of the processor that an update to the hardware feedback information provided from the power controller to a scheduler can be effected; and
   updating a configuration register of the processor to enable the power controller to dynamically calculate the hardware feedback information.

13. The at least one non-transitory computer readable storage medium of claim 12, wherein the method further comprises mapping a first logical processor identifier associated with a first logical processor to a first entry of the hardware feedback structure, the first entry to store hardware feedback information associated with the first logical processor.

14. The at least one non-transitory computer readable storage medium of claim 13, wherein the method further comprises:
   reading the update to the hardware feedback information from the first entry;
   updating a scheduling structure based at least in part on the update; and
   scheduling at least one thread to the first logical processor using information stored in the scheduling structure.

15. The at least one non-transitor computer readable storage medium of claim 14, wherein the method further comprises resetting the hardware feedback indicator of the status register after reading the update.

16. The at least one non-transitory computer readable storage medium of claim 12, wherein the method further comprises setting a hardware feedback notification indicator of an interrupt register of the processor to cause an interrupt in response to the update to the hardware feedback information.

17. The at least one non-transitory computer readable storage medium of claim 12, wherein the method further comprises disabling the power controller from updating the hardware feedback information, via a second update to the configuration register.

18. A system comprising:
   a processor comprising:
      a first core to execute instructions;
      a plurality of second cores to execute instructions, the plurality of second cores heterogeneous to and smaller than the first core;
      a shared cache memory;
      a power controller coupled to the first core and the plurality of second cores, the power controller including a feedback control circuit to dynamically determine hardware feedback information for one or more of the first core and the plurality of second cores based at least in part on a workload and one or more of a thermal constraint and a power constraint;

a status register having a first field to store a first indicator, wherein when the first indicator of the status register is of a first state, the feedback control circuit is to write an update to the hardware feedback information; and an interrupt register having a first field to store a first indicator, wherein when the first indicator of the interrupt register is of the first state, the processor is to issue an interrupt in response to the update to the hardware feedback information; and a system memory coupled to the processor, the system memory comprising a hardware feedback structure to store the hardware feedback information.

19. The system of claim 18, wherein a scheduler is to schedule a first thread on a second core of the plurality of second cores when a current performance capability and a current energy efficiency capability of the second core are greater than a current performance capability and a current energy efficiency capability of the first core.

20. The system of claim 18, wherein the feedback control circuit is to write the update to the hardware feedback information to the shared cache memory and the scheduler is to access hardware feedback information from the shared cache memory, wherein the shared cache memory is to write back the update of the hardware feedback information to the hardware feedback structure.

* * * * *

UNITED STATES PATENT AND TRADEMARK OFFICE
CERTIFICATE OF CORRECTION

PATENT NO. : 10,620,969 B2
APPLICATION NO. : 15/936585
DATED : April 14, 2020
INVENTOR(S) : Vedvyas Shanbhogue et al.

Page 1 of 1

It is certified that error appears in the above-identified patent and that said Letters Patent is hereby corrected as shown below:

In the Claims

Column 34:
Line 39, "non-transitor" should be --non-transitory--.

Signed and Sealed this
Second Day of June, 2020

Andrei Iancu
*Director of the United States Patent and Trademark Office*